US010996813B2

(12) United States Patent
Makarenkova et al.

(10) Patent No.: US 10,996,813 B2
(45) Date of Patent: May 4, 2021

(54) DIGITAL TREATMENT PLANNING BY MODELING INTER-ARCH COLLISIONS

(71) Applicant: Align Technology, Inc., San Jose, CA (US)

(72) Inventors: Svetlana Makarenkova, Moscow (RU); Artem Kuanbekov, Moscow (RU); Aleksandr Zhulin, Moscow (RU); Boris Likhtman, Pushkino (RU); Vladimir Grenaderov, Moscow (RU)

(73) Assignee: Align Technology, Inc., San Jose, CA (US)

( * ) Notice: Subject to any disclaimer, the term of this patent is extended or adjusted under 35 U.S.C. 154(b) by 0 days.

(21) Appl. No.: 16/457,754

(22) Filed: Jun. 28, 2019

(65) Prior Publication Data

US 2020/0004402 A1   Jan. 2, 2020

Related U.S. Application Data

(60) Provisional application No. 62/692,538, filed on Jun. 29, 2018.

(51) Int. Cl.
*G06F 3/048*   (2013.01)
*G06F 3/0481*   (2013.01)
*G06F 3/0484*   (2013.01)
*G06F 3/0482*   (2013.01)
*A61C 7/00*   (2006.01)

(52) U.S. Cl.
CPC .......... *G06F 3/04815* (2013.01); *A61C 7/002* (2013.01); *G06F 3/0482* (2013.01); *G06F 3/04845* (2013.01)

(58) Field of Classification Search
CPC .............. G06F 3/04815; G06F 3/0482; G06F 3/04845; A61C 7/002
USPC ......................................................... 715/771
See application file for complete search history.

(56) References Cited

U.S. PATENT DOCUMENTS

| | | | |
|---|---|---|---|
| 5,975,893 A * | 11/1999 | Chishti | B33Y 80/00 |
| 6,227,850 B1 | 5/2001 | Chishti et al. | |
| 6,227,851 B1 | 5/2001 | Chishti et al. | |
| 6,299,440 B1 | 10/2001 | Phan et al. | |
| 6,318,994 B1 | 11/2001 | Chishti et al. | |
| 6,371,761 B1 | 4/2002 | Cheang et al. | |
| 6,386,878 B1 | 5/2002 | Pavlovskaia et al. | |
| 6,406,292 B1 | 6/2002 | Chishti et al. | |
| 6,471,512 B1 * | 10/2002 | Sachdeva | A61C 7/00 433/24 |
| 6,488,499 B1 | 12/2002 | Miller | |
| 6,514,074 B1 | 2/2003 | Chishti et al. | |
| 6,582,229 B1 | 6/2003 | Miller et al. | |
| 6,621,491 B1 | 9/2003 | Baumrind et al. | |
| 6,726,478 B1 | 4/2004 | Isiderio et al. | |

(Continued)

*Primary Examiner* — David Phantana-angkool
(74) *Attorney, Agent, or Firm* — Shay Glenn LLP

(57) ABSTRACT

Orthodontic devices such as aligners, palatal expanders, retainers, and dental implants can be used to adjust the position of teeth and to treat various dental irregularities. To help the clinician or doctor (i.e., orthodontist) design and plan the subject's treatment plan, a 3D digital model of the subject's teeth, dentition, and gingiva can be constructed from a 3D scan of the subject's mouth, teeth, dentition, and gingiva. The 3D model of the subject's teeth and dentition can be displayed graphically to the doctor on a display using a computing system with memory and software.

22 Claims, 17 Drawing Sheets

(56) References Cited

U.S. PATENT DOCUMENTS

| | | |
|---|---|---|
| 6,767,208 B2 | 7/2004 | Kaza |
| 6,783,360 B2 | 8/2004 | Chishti |
| 7,074,038 B1 | 7/2006 | Miller |
| 7,074,039 B2 | 7/2006 | Kopelman et al. |
| 7,077,647 B2 | 7/2006 | Choi et al. |
| 7,293,988 B2 | 11/2007 | Wen |
| 7,309,230 B2 | 12/2007 | Wen |
| 7,357,634 B2 | 4/2008 | Knopp |
| 7,555,403 B2 | 6/2009 | Kopelman et al. |
| 7,637,740 B2 | 12/2009 | Knopp |
| 7,689,398 B2 | 3/2010 | Cheng et al. |
| 7,746,339 B2 | 8/2010 | Matov et al. |
| 7,844,356 B2 | 11/2010 | Matov et al. |
| 7,844,429 B2 | 11/2010 | Matov et al. |
| 7,865,259 B2 | 1/2011 | Kuo et al. |
| 7,878,804 B2 | 2/2011 | Korytov et al. |
| 7,880,751 B2 | 2/2011 | Kuo et al. |
| 7,904,308 B2 | 3/2011 | Arnone et al. |
| 7,930,189 B2 | 4/2011 | Kuo |
| 7,942,672 B2 | 5/2011 | Kuo |
| 7,970,627 B2 | 6/2011 | Kuo et al. |
| 7,970,628 B2 | 6/2011 | Kuo et al. |
| 8,038,444 B2 | 10/2011 | Kitching et al. |
| 8,044,954 B2 | 10/2011 | Kitching et al. |
| 8,075,306 B2 | 12/2011 | Kitching et al. |
| 8,092,215 B2 | 1/2012 | Stone-Collonge et al. |
| 8,108,189 B2 | 1/2012 | Chelnokov et al. |
| 8,126,726 B2 | 2/2012 | Matov et al. |
| 8,260,591 B2 | 9/2012 | Kass et al. |
| 8,275,180 B2 | 9/2012 | Kuo |
| 8,401,826 B2 | 3/2013 | Cheng et al. |
| 8,439,672 B2 | 5/2013 | Matov et al. |
| 8,562,338 B2 | 10/2013 | Kitching et al. |
| 8,591,225 B2 | 11/2013 | Wu et al. |
| 8,788,285 B2 | 7/2014 | Kuo |
| 8,843,381 B2 | 9/2014 | Kuo et al. |
| 8,874,452 B2 * | 10/2014 | Kuo ...................... A61C 7/002 705/2 |
| 8,896,592 B2 | 11/2014 | Boltunov et al. |
| 9,037,439 B2 | 5/2015 | Kuo et al. |
| 9,060,829 B2 | 6/2015 | Sterental et al. |
| 9,125,709 B2 | 9/2015 | Matty |
| 9,211,166 B2 | 12/2015 | Kuo et al. |
| 9,220,580 B2 | 12/2015 | Borovinskih et al. |
| 9,364,296 B2 | 6/2016 | Kuo |
| 9,375,300 B2 | 6/2016 | Matov et al. |
| 9,414,897 B2 | 8/2016 | Wu et al. |
| 9,642,678 B2 * | 5/2017 | Kuo ...................... G06F 30/20 |
| 9,675,428 B2 * | 6/2017 | Wu ....................... A61C 9/006 |
| 10,143,536 B2 * | 12/2018 | Andreiko ................ A61B 6/14 |
| 10,248,883 B2 | 4/2019 | Borovinskih et al. |
| 10,368,719 B2 * | 8/2019 | Andreiko ................ A61C 7/002 |
| 10,390,913 B2 * | 8/2019 | Sabina ................... A61C 9/0053 |
| 10,463,452 B2 | 11/2019 | Matov et al. |
| 10,507,087 B2 * | 12/2019 | Elbaz ...................... A61B 1/24 |
| 10,509,838 B2 * | 12/2019 | Elbaz ...................... H04N 13/254 |
| 10,517,482 B2 * | 12/2019 | Sato ........................ A61C 7/08 |
| 10,537,405 B2 * | 1/2020 | Choi ....................... A61C 7/08 |
| 10,568,716 B2 * | 2/2020 | Mah ....................... G16H 50/20 |
| 10,595,965 B2 * | 3/2020 | Khardekar ............. G06F 30/00 |
| 10,595,966 B2 | 3/2020 | Carrier, Jr. et al. |
| 10,617,489 B2 | 4/2020 | Grove et al. |
| 10,631,954 B1 * | 4/2020 | Raslambekov ........ A61C 19/05 |
| 10,631,956 B1 * | 4/2020 | Raslambekov ........ A61C 13/34 |
| 10,653,502 B2 * | 5/2020 | Kuo ........................ A61C 7/08 |
| 10,758,322 B2 | 9/2020 | Pokotilov et al. |
| 10,779,718 B2 | 9/2020 | Meyer et al. |
| 10,792,127 B2 | 10/2020 | Kopelman et al. |
| 10,828,130 B2 | 11/2020 | Pokotilov et al. |
| 10,835,349 B2 | 11/2020 | Cramer et al. |
| 2003/0009252 A1 * | 1/2003 | Pavlovskaia ........... B33Y 50/00 700/98 |
| 2003/0143509 A1 | 7/2003 | Kopelman et al. |
| 2003/0207227 A1 | 11/2003 | Abolfathi |
| 2004/0152036 A1 | 8/2004 | Abolfathi |
| 2004/0259049 A1 | 12/2004 | Kopelman et al. |
| 2005/0182654 A1 | 8/2005 | Abolfathi et al. |
| 2005/0244791 A1 | 11/2005 | Davis et al. |
| 2006/0127836 A1 | 6/2006 | Wen |
| 2006/0127852 A1 | 6/2006 | Wen |
| 2006/0127854 A1 | 6/2006 | Wen |
| 2006/0275731 A1 | 12/2006 | Wen et al. |
| 2006/0275736 A1 | 12/2006 | Wen et al. |
| 2007/0238065 A1 * | 10/2007 | Sherwood ................ A61C 7/08 433/24 |
| 2008/0306724 A1 | 12/2008 | Kitching et al. |
| 2009/0098502 A1 * | 4/2009 | Andreiko ............... G16H 40/63 433/24 |
| 2010/0009308 A1 | 1/2010 | Wen et al. |
| 2010/0068672 A1 | 3/2010 | Arjomand et al. |
| 2010/0068676 A1 | 3/2010 | Mason et al. |
| 2010/0092907 A1 | 4/2010 | Knopp |
| 2010/0129762 A1 * | 5/2010 | Mason .................... A61C 7/002 433/6 |
| 2010/0167243 A1 | 7/2010 | Spiridonov et al. |
| 2013/0204599 A1 | 8/2013 | Matov et al. |
| 2014/0294273 A1 * | 10/2014 | Jaisson ................... A61B 5/0035 382/131 |
| 2014/0335466 A1 * | 11/2014 | Kitching .................. A61C 7/08 433/6 |
| 2015/0025907 A1 * | 1/2015 | Trosien .................. G06Q 10/10 705/2 |
| 2016/0135925 A1 * | 5/2016 | Mason .................... G16H 50/50 703/2 |
| 2016/0242870 A1 | 6/2016 | Matov et al. |
| 2016/0287354 A1 * | 10/2016 | Viecilli ................... A61C 7/002 |
| 2016/0310235 A1 | 10/2016 | Derakhshan et al. |
| 2018/0168775 A1 | 6/2018 | Derakhshan et al. |
| 2018/0263731 A1 | 9/2018 | Pokotilov et al. |
| 2018/0280118 A1 | 10/2018 | Cramer |
| 2019/0029784 A1 | 1/2019 | Moalem et al. |
| 2019/0053876 A1 | 2/2019 | Sterental et al. |
| 2019/0076214 A1 | 3/2019 | Nyukhtikov et al. |
| 2019/0105127 A1 | 4/2019 | Velazquez et al. |
| 2019/0175303 A1 * | 6/2019 | Akopov .................. A61C 9/0053 |
| 2019/0180443 A1 | 6/2019 | Xue et al. |
| 2019/0192259 A1 | 6/2019 | Kopelman et al. |
| 2019/0328487 A1 | 10/2019 | Levin et al. |
| 2019/0328488 A1 | 10/2019 | Levin et al. |
| 2019/0333622 A1 | 10/2019 | Levin et al. |
| 2019/0343601 A1 | 11/2019 | Roschin et al. |
| 2019/0350680 A1 | 11/2019 | Chekh et al. |
| 2019/0357997 A1 | 11/2019 | Shi et al. |
| 2020/0000551 A1 | 1/2020 | Li et al. |
| 2020/0000552 A1 * | 1/2020 | Mednikov ............... A61C 5/20 |
| 2020/0000554 A1 * | 1/2020 | Makarenkova ......... G16H 10/60 |
| 2020/0000555 A1 | 1/2020 | Yuryev et al. |
| 2020/0004402 A1 * | 1/2020 | Makarenkova ......... A61C 7/002 |
| 2020/0085546 A1 | 3/2020 | Li et al. |
| 2020/0105028 A1 | 4/2020 | Gao et al. |
| 2020/0107915 A1 | 4/2020 | Roschin et al. |
| 2020/0113649 A1 * | 4/2020 | Lee ........................ A61C 7/002 |
| 2020/0155274 A1 * | 5/2020 | Pimenov ................. A61C 19/04 |
| 2020/0214800 A1 | 7/2020 | Matov et al. |
| 2020/0297458 A1 | 9/2020 | Roschin et al. |
| 2020/0306011 A1 | 10/2020 | Chekhonin et al. |
| 2020/0306012 A1 | 10/2020 | Roschin et al. |
| 2020/0315744 A1 | 10/2020 | Cramer |
| 2020/0360109 A1 | 11/2020 | Gao et al. |
| 2020/0397304 A1 * | 12/2020 | Kopelman ............... A61B 6/032 |

* cited by examiner

DIGITAL TREATMENT PLANNING BY MODELING INTER-ARCH COLLISIONS

CROSS REFERENCE TO RELATED APPLICATIONS

This patent application claims priority to U.S. provisional patent application No. 62/692,538, titled "VISUALIZATION OF TEETH" and filed on Jun. 29, 2018, herein incorporated by reference in its entirety.

This application may be related to U.S. patent application Ser. No. 16/178,491, titled "AUTOMATIC TREATMENT PLANNING," filed on Nov. 1, 2018 and herein incorporated by reference in its entirety.

INCORPORATION BY REFERENCE

All publications and patent applications mentioned in this specification are herein incorporated by reference to the same extent as if each individual publication or patent application was specifically and individually indicated to be incorporated by reference.

FIELD

Embodiments of the invention relate generally to systems and method for the visualization of teeth.

BACKGROUND

Orthodontic devices such as aligners, palatal expanders, retainers, and dental implants can be used to adjust the position of teeth and to treat various dental irregularities. To help the clinician or doctor (i.e., orthodontist) design and plan the subject's treatment plan, a three-dimensional (3D) digital model of the subject's teeth, dentition, and gingiva can be constructed from a 3D scan of the subject's mouth, teeth, dentition, and gingiva. The 3D model of the subject's teeth and dentition can be displayed graphically to the doctor on a display using a computing system with memory and software.

It would be desirable to provide the doctor with the ability to easily visualize and compare various 3D models of the subject's teeth at different stages of the treatment along with the effect of various features that can be used during the treatment.

SUMMARY OF THE DISCLOSURE

The methods and apparatuses (e.g., systems, devices, etc.) described herein may relate to orthodontic treatment planning, including the visualization of teeth for modifying, enhancing and improving treatment plans. In particular, described herein are methods and apparatuses for reviewing, analyzing and/or modifying orthodontic treatment plans. These methods may include one or more user interfaces that are configured to improve review and modification of orthodontic treatment planning.

For example a method may include: displaying a staging toolbar on a first portion of a display, wherein the staging toolbar comprises a plurality of digital buttons that correspond to a plurality of three dimensional (3D) digital models of a subject's dentition, wherein the plurality of 3D models includes a first model that shows an arrangement of a subject's teeth before receiving a treatment, one or more intermediate models that show an arrangement of the subject's teeth during a stage of the treatment, and a final model that shows an arrangement of the subject's teeth after receiving the treatment; displaying a displayed 3D model corresponding to one of the plurality of 3D models; changing the displayed 3D model to correspond to whichever digital button is selected by a user; adjusting a view of the displayed 3D model shown on the display based on a user input, wherein the view of the displayed 3D model is applied to the changed displayed 3D model as the user selects the digital buttons.

The staging toolbar may be a virtual toolbar including the plurality of digital buttons, which may be arranged within the display (screen, touchscreen, virtual display, augmented reality display, etc.). For example, the staging toolbar may be an arrangement of virtual buttons on the top, side(s) and/or bottom of the display that may be selected by a user, e.g., by clicking on them or otherwise selecting them.

The digital model of the subject's dentition may include a 3D surface (or in some variations surface and volumetric) model of the subject's upper and/or lower arch, including teeth and in some variations gingiva (e.g., particularly the portion of gingiva around the teeth). The 3D model may be segmented into individual teeth that may be separately selected and/or moved by the user or system. The system or method may store user inputs and/or generate user output, e.g., modifications to the display, based on user selections from the controls and the processing by the system.

At least some of the digital buttons may correspond to overcorrection stages. The digital buttons that correspond to the overcorrection stages may be hidden or revealed by user-controlled switch (e.g., a virtual button on the display that allows the user to toggle between showing and hiding the overcorrection stages), and/or selecting the overcorrecting stages as part of an actual treatment plan.

The user input may include adjustments to the display of the 3D model, including one or more of: a rotation, a zoom, or a pan of the displayed 3D model. Additional tools may include showing the surface of the 3D model, showing a wireframe of the 3D model, changing the color of the 3D model, etc.

The user input may include selecting from a set of preset views, such as showing the 3D model of the upper and/or lower jaw in a frontal view, a left side view, a right side view, a back view, etc.

The user input may include selecting to display or hide on the view of the teeth of the 3D model one or more of: tooth numbering, attachments, interproximal reduction spacing, and pontics. These display options may be separately controlled, e.g., by including one or more virtual controls (e.g., buttons, switches, etc.) that allows the selection of each of these features individually or collectively. The system may include processing to determine or suggest one or more of these features (e.g., determining automatically or semi-automatically tooth numbering, position, number and/or orientation of attachments, hooks, ramps, etc.

Changing the displayed 3D model to correspond to whichever digital button is selected by a user may include calculating the viewing angle and magnification from a current displayed 3D model and applying the calculated viewing angle and magnification to a new 3D model from the plurality of 3D models corresponding to the digital button selected by the user.

Also described herein are systems configured to perform any of the methods described herein. These systems may include one or more processors and may include a memory coupled to the one or more processors configured to store computer-program instructions that, when executed by the one or more processors, perform the methods.

For example, A system (e.g., for assisting in treatment planning, for visualizing a subject's teeth, for reviewing and/or modifying a treatment plan) may include: one or more processors; a memory coupled to the one or more processors, the memory configured to store computer-program instructions, that, when executed by the one or more processors, perform a computer-implemented method comprising: displaying a staging toolbar on a first portion of a display, wherein the staging toolbar comprises a plurality of digital buttons that correspond to a plurality of three dimensional (3D) digital models of a subject's dentition, wherein the plurality of 3D models includes a first model that shows an arrangement of a subject's teeth before receiving a treatment, one or more intermediate models that show an arrangement of the subject's teeth during a stage of the treatment, and a final model that shows an arrangement of the subject's teeth after receiving the treatment; displaying a displayed 3D model corresponding to one of the plurality of 3D models; changing the displayed 3D model to correspond to whichever digital button is selected by a user; and adjusting a view of the displayed 3D model shown on the display based on a user input, wherein the view of the displayed 3D model is applied to the changed displayed 3D model as the user selects the digital buttons.

Any of the methods and apparatuses described herein may be configured to also or alternatively display multiple 3D models, including multiple treatment plans (each having the same or a different number of treatment stages), and/or display a 3D model (e.g., surface model) of an initial (unmodified) arrangement of the subject's teeth with one or more treatment plans (each having multiple treatment stages). The system and method may enhance review of the treatment plan(s) by allowing the user to make changes in the appearance (angle, zoom, pan, etc.), and/or selection of a displayed treatment stage when displaying multiple treatment plans, of one of the displayed 3D models and concurrently making the same (or similar) changes in the other treatment plans.

Any of these systems and methods may also address the problem of complexity associated with the display of one or more treatment plans, in which each treatment plan includes a large number of stages, and multiple potential 'treatments' at each stage, such as changes in the tooth position, angle, etc., as well as the components of the treatment applied or to be applied, such as interproximal reduction, extraction, ramps, attachments, hooks, etc. These components may be different at different stages of each treatment plan and may be widely different or similar between different treatment plans. The methods an apparatuses may provide simplified techniques for controlling the otherwise complicated and information-dense displays. For example, in some variations the methods and apparatuses may include informative controls that allow toggling of display options on or off, but may also include information about these features being displayed or features related to those being displayed.

For example, described herein are methods comprising: displaying, side-by-side on a display, a first three dimensional (3D) model of a subject's dentition that shows an arrangement of the subject's teeth before receiving a treatment, and a second 3D model that shows an arrangement of the subject's teeth subject to a first orthodontic treatment; wherein the second 3D model is displayed at either a final stage or an intermediate treatment stage of the first orthodontic treatment; adjusting a view of both of the first 3D model and the second 3D model based on a user input modifying a view of one of the first 3D model or the second 3D model; displaying a staging toolbar on a portion of a display, wherein the staging toolbar comprises a plurality of digital buttons that correspond to a plurality of treatment stages of the first orthodontic treatment; and changing the displayed stage of the second 3D model to correspond to a stage selected by the user from the staging toolbar.

Any of these methods may also include displaying a plurality of buttons corresponding to treatment features, wherein the buttons visually indicate the presence of the treatment feature in the first orthodontic treatment and further wherein the buttons visually indicate that that treatment feature is actively being displayed on either or both the first 3D model and the second 3D model.

The plurality of treatment features may include: tooth numbering, attachments, interproximal reduction spacing, and pontics. The user input may include one or more of: a rotation, a zoom, or a pan of the displayed 3D models. In some variations, the user input includes selecting from a set of preset views.

For example, a method may include: displaying, side-by-side on a display, a plurality of three dimensional (3D) models of a subject's dentition, wherein the plurality of 3D models includes two or more of: a first 3D model that shows an arrangement of the subject's teeth before receiving a treatment, a second 3D model that shows an arrangement of the subject's teeth subject to a first orthodontic treatment, and a third 3D model that shows an arrangement of the subject's teeth subject to a second orthodontic treatment; wherein when either or both the first 3D model and the second 3D model are displayed, the first 3D model and the second 3D model are displayed at either a final stage or an intermediate treatment stage; and adjusting a view of all of the displayed 3D models based on a user input modifying one of the plurality of 3D models.

Any of these methods (or apparatus performing them) may include displaying a staging toolbar on a portion of a display, wherein the staging toolbar comprises a plurality of digital buttons that correspond to a plurality of treatment stages, and wherein when either or both the first 3D model and the second 3D model are displayed, changing the displayed stage to correspond to a stage selected by the user from the staging toolbar. The method or apparatus may include displaying a plurality of buttons corresponding to treatment features, wherein the buttons visually indicate the presence of the treatment feature in the first orthodontic treatment or the second orthodontic treatment and further wherein the buttons visually indicate that that treatment feature is actively being displayed on either or both the first 3D model and the second 3D model. The plurality of treatment features may comprises: tooth numbering, attachments, interproximal reduction spacing, hooks, ramps, pontics, etc. The user input may include one or more of: a rotation, a zoom, or a pan of the displayed 3D models. The user input may include selecting from a set of preset views.

A system for visualizing a subject's teeth, the system comprising: one or more processors; a memory coupled to the one or more processors, the memory configured to store computer-program instructions, that, when executed by the one or more processors, perform a computer-implemented method comprising: displaying, side-by-side on a display, a first three dimensional (3D) model of a subject's dentition that shows an arrangement of the subject's teeth before receiving a treatment, and a second 3D model that shows an arrangement of the subject's teeth subject to a first orthodontic treatment; wherein the second 3D model is displayed at either a final stage or an intermediate treatment stage of the first orthodontic treatment; adjusting a view of both of the first 3D model and the second 3D model based on a user input modifying a view of one of the first 3D model or the second 3D model; displaying a staging toolbar on a portion of a display, wherein the staging toolbar comprises a plurality of digital buttons that correspond to a plurality of treatment stages of the first orthodontic treatment; and changing the displayed stage of the second 3D model to correspond to a stage selected by the user from the staging toolbar.

A system for visualizing a subject's teeth, the system comprising: one or more processors; a memory coupled to the one or more processors, the memory configured to store computer-program instructions, that, when executed by the one or more processors, perform a computer-implemented method comprising: displaying, side-by-side on a display, a plurality of three dimensional (3D) models of a subject's dentition, wherein the plurality of 3D models includes two or more of: a first 3D model that shows an arrangement of the subject's teeth before receiving a treatment, a second 3D model that shows an arrangement of the subject's teeth subject to a first orthodontic treatment, and a third 3D model that shows an arrangement of the subject's teeth subject to a second orthodontic treatment; wherein when either or both the first 3D model and the second 3D model are displayed, the first 3D model and the second 3D model are displayed at either a final stage or an intermediate treatment stage; adjusting a view of all of the displayed 3D models based on a user input modifying one of the plurality of 3D models. These systems may be configured to include any of the method features described herein.

Also described herein are methods and apparatuses for reviewing, modifying, confirming and/or selecting a treatment plan that includes comparing occlusal collisions of teeth between one or more treatment plans and/or the untreated teeth. Any of the systems and methods above may include this feature, which may be a user-selectable control (e.g., button, etc.), such as a virtual button that switches a view of the 3D model(s), such as a frontal and/or side view of one or more dental arches (e.g., upper and/or lower arches) to an occlusal view showing the occlusal surfaces of the upper and/or lower dental arches. The occlusal surface may include indicator(s) of the severity of contact (collision) between the upper and lower jaw in normal intercuspation of the teeth. The severity of contact (collision) may be shown as a threshold, showing two states, "low" or "normal" contact and "high" or "severe" contact. Alternatively or additionally, contact/collision may be shown as a heat map indicating a scaled degree of contact/collision and/or an annotated indicator (numerical, alphanumeric, etc.) indicating the contact severity.

For example, a method may include: displaying, on a display, a first three dimensional (3D) model of a subject's dentition that shows an arrangement of the subject's teeth before receiving a treatment, and a second 3D model that shows an arrangement of the subject's teeth subject to a first orthodontic treatment; wherein the second 3D model is displayed at either a final stage or an intermediate treatment stage of the first orthodontic treatment; adjusting a view of both of the first 3D model and the second 3D model based on a user input modifying a view of one of the first 3D model or the second 3D model; switching the view of both the first 3D model and the second 3D model to an occlusal view when the user selects a control, wherein the occlusal view shows occlusal surfaces of teeth in the first 3D model and the second 3D model, further wherein the occlusal view indicates one or more regions of inter-arch collisions on either or both of the first 3D model and the second 3D model.

The occlusal view may indicate one or more regions of inter-arch collisions using an indicator that is scaled to differentiate a relative degree of contact between an upper arch and a lower arch. The indicator may be colored differently to differentiate regions of normal contact from regions of high contact (e.g., normal contact in green, high contact in red). The method or system may be configured to calculate the regions of inter-arch collision on the first 3D model and calculating regions of inter-arch collision on region on the second 3D model. The method or system may further set a threshold (or may apply a user-specified threshold) of contact degree to differentiate normal from high. For example, in some variations the user interface may include a dial or slider that allows selection of the degree of contact.

In some variations, the method may include displaying a staging toolbar on a portion of a display, wherein the staging toolbar comprises a plurality of digital buttons that correspond to a plurality of treatment stages of the first orthodontic treatment; and changing the displayed stage of the second 3D model to correspond to a stage selected by the user from the staging toolbar.

In any of these methods and apparatuses, the different 3D models may be displayed side-by-side, in either the same or different windows. The method or system may include displaying an upper arch engaged with a lower arch of the first 3D model and displaying an upper arch engaged with a lower arch of the second 3D model. Any of these methods or apparatuses may be configured to display a plurality of buttons corresponding to treatment features, wherein the buttons visually indicate the presence of the treatment feature in the first orthodontic treatment and further wherein the buttons visually indicate that that treatment feature is actively being displayed on either or both the first 3D model and the second 3D model. For example, the plurality of treatment features may comprise: tooth numbering, attachments, interproximal reduction spacing, hooks, ramps (e.g., bite ramps), pontics, etc.

Adjusting the view of both of the first 3D model and the second 3D model based on the user input may include modifying one or more of: a rotation, a zoom, or a pan of the first 3D model and the second 3D model. Thus, these viewing options may be concurrently adjusted (translating the user adjustments in the display parameters of one 3D model to the other 3D model, etc., typically in real time). In some variations, the user input may include selecting from a set of preset views.

For example, a method may include: displaying, on a display, a first three dimensional (3D) model of a subject's dentition that shows an arrangement of the subject's teeth before receiving a treatment, and a second 3D model that shows an arrangement of the subject's teeth subject to a first orthodontic treatment; wherein the second 3D model is displayed at either a final stage or an intermediate treatment stage of the first orthodontic treatment; adjusting a view of both of the first 3D model and the second 3D model based on a user input modifying a view of one of the first 3D model or the second 3D model, wherein adjusting the view comprises adjusting one or more of the rotation, zoom and pan; switching the view of both the first 3D model and the second 3D model to an occlusal view when the user selects a control, wherein the occlusal view shows occlusal surfaces of teeth in the first 3D model and the second 3D model, further wherein the occlusal view indicates one or more regions of inter-arch collisions on either or both of the first 3D model and the second 3D model, using an indicator that is scaled to differentiate a relative degree of contact between an upper arch and a lower arch.

In any of these methods and apparatuses, the indicator may be colored or marked differently to differentiate regions of normal contact from regions of high contact. The indicator maybe a region associated with the button (e.g., within a boundary of the button), such as a box, circle, dot, etc., on the button and/or a marking on the button, including the text used to indicate the primary function of the button (e.g., attachments, IPR, pontics, extraction(s), etc.).

Any of these methods or apparatuses may include calculating regions of inter-arch collision on the first 3D model and calculating regions of inter-arch collision on region on the second 3D model, as part of an inter-arch collision calculator module. Any of these methods or apparatuses may also or alternatively include displaying a staging toolbar on a portion of a display, wherein the staging toolbar comprises a plurality of digital buttons that correspond to a plurality of treatment stages of the first orthodontic treatment; and changing the displayed stage of the second 3D model to correspond to a stage selected by the user from the staging toolbar.

As mentioned, any of the methods an apparatuses may include side-by-side, and/or displaying the upper arch engaged with the lower arch of the first 3D model and displaying the upper arch engaged with the lower arch of the second 3D model (e.g., showing the upper and lower arch intercuspating).

Any of these methods and apparatuses may include displaying a plurality of buttons corresponding to treatment features, wherein the buttons visually indicate the presence of the treatment feature in the first orthodontic treatment and further wherein the buttons visually indicate that that treatment feature is actively being displayed on either or both the first 3D model and the second 3D model. As mentioned above, the plurality of treatment features may include: tooth numbering, attachments, interproximal reduction spacing, ramps, hooks, pontics, etc. Adjusting the view of both of the first 3D model and the second 3D model based on the user input may include modifying one or more of: a rotation, a zoom, or a pan of the first 3D model and the second 3D model. The user input may include selecting from a set of preset views.

Also described herein are systems for visualizing a subject's teeth that may include: one or more processors; a memory coupled to the one or more processors, the memory configured to store computer-program instructions, that, when executed by the one or more processors, perform a computer-implemented method comprising: displaying, on a display, a first three dimensional (3D) model of a subject's dentition that shows an arrangement of the subject's teeth before receiving a treatment, and a second 3D model that shows an arrangement of the subject's teeth subject to a first orthodontic treatment; wherein the second 3D model is displayed at either a final stage or an intermediate treatment stage of the first orthodontic treatment; adjusting a view of both of the first 3D model and the second 3D model based on a user input modifying a view of one of the first 3D model or the second 3D model; switching the view of both the first 3D model and the second 3D model to an occlusal view when the user selects a control, wherein the occlusal view shows occlusal surfaces of teeth in the first 3D model and the second 3D model, further wherein the occlusal view indicates one or more regions of inter-arch collisions on either or both of the first 3D model and the second 3D model. As mentioned above, any of these systems may be further configured to perform any of these method steps described above (e.g., by include one or more software modules or components for performing them.

Also described herein are systems for visualizing a subject's teeth that include: one or more processors; a memory coupled to the one or more processors, the memory configured to store computer-program instructions, that, when executed by the one or more processors, perform a computer-implemented method comprising: displaying a staging toolbar on a first portion of a display, wherein the staging toolbar comprises one or more digital buttons that corresponding to a plurality of three dimensional models, wherein the plurality of three dimensional models include includes a first model that shows the subject's teeth position before receiving treatment, one or more intermediate models that show the subject's teeth position during treatment, and a final model that shows the subject's teeth position after receiving treatment; presenting a multiple view digital button on a second portion of the display; and presenting on the display both the first model and a second model when the multiple view digital button is selected by a user, wherein the second model is selected from one of the intermediate models or the final model. The second model may be determined by a selection of one of the digital button of the staging toolbar. The computer-implemented method may further comprise: presenting a feature button on the display; and presenting, on the display, the feature on the three dimensional model of the subject's teeth. For example, the feature button may be an attachment button, wherein the computer-implemented method further comprises presenting, on the display, attachments on the subject's teeth when the attachment button is selected. The feature button may be a pontics button, wherein the computer-implemented method further comprises presenting on the display, pontics on the subject's teeth when the pontics button is selected. The feature button may be an interproximal reduction and space management button, wherein the computer-implemented method further comprises presenting, on the display, interproximal reduction and space management data on the subject's teeth when the interproximal reduction and space management button is selected.

Any of these methods may also include: presenting an on state for the feature button when the feature button is selected by the user; presenting an off state for the feature button when the feature button is not selected by the user, wherein the on state is visually distinguishable from the off state; and presenting the feature on the three dimensional model when the feature button is in the on state; not presenting the feature on the three dimensional model when the feature button is in the off state; and presenting an indicator associated with the feature button that indicates whether the feature is present or absent from the treatment.

As mentioned above, the staging toolbar may include one or more hidden overcorrection stages, wherein the computer-implemented method further comprises presenting the one or more hidden overcorrection stages when the user clicks or selects a button next to the staging toolbar or integrated into one end of the staging toolbar. The feature button may be an occlusal button, wherein the computer-implemented method further comprises presenting, on the display, occlusal contacts on the subject's teeth when the occlusal button is selected. For example, the occlusal contacts may comprise normal occlusal contacts that are shown in a first color and heavy inter-arch collisions that are shown in a second color.

Any of these methods may include: storing in a memory, a plurality of three dimensional models of the subject's teeth, wherein the plurality of three dimensional models includes a first model that shows the subject's teeth position before receiving treatment, one or more intermediate models that show the subject's teeth position during treatment, and a final model that shows the subject's teeth position after receiving treatment. The method may further include displaying, using the processor, a staging toolbar on a first portion of the display, wherein the staging toolbar comprises one or more digital buttons that corresponding to the plurality of three dimensional models; displaying, using the processor, a multiple view digital button on a second portion of the display; and displaying, using the processor, on the display both the first model and a second model when the multiple view digital button is selected by a user, wherein the second model is selected from one of the intermediate models or the final model. Alternatively or additionally, the method may include: displaying, using the processor, a feature button on the display; and displaying, using the processor, on the display the feature on the three dimensional model of the subject's teeth.

As mentioned, the feature button may be an attachment button, wherein the method may further comprise displaying, using the processor, on the display attachments on the subject's teeth when the attachment button is selected. The feature button may be a pontics button, wherein the method may further comprise displaying, using the processor, on the display pontics on the subject's teeth when the pontics button is selected. The feature button may be an interproximal reduction and space management button, wherein the method may further comprise displaying, using the processor, interproximal reduction and space management data on the subject's teeth when the interproximal reduction and space management button is selected.

The method may include displaying, using a processor, an on state for the feature button when the feature button is selected by the user; displaying, using a processor, an off state for the feature button when the feature button is not selected by the user, wherein the on state is visually distinguishable from the off state; and displaying, using a processor, the feature on the three dimensional model when the feature button is in the on state; not displaying, using a processor, the feature on the three dimensional model when the feature button is in the off state; and displaying, using a processor, an indicator associated with the feature button that indicates whether the feature is present or absent from the treatment. The staging toolbar may comprise one or more hidden overcorrection stages, wherein method further comprises displaying the one or more hidden overcorrection stages when the user clicks or selects a button next to the staging toolbar or integrated into one end of the staging toolbar. The feature button may be an occlusal button, wherein the method further comprises displaying on the display occlusal contacts on the subject's teeth when the occlusal button is selected.

For example, a method of visualizing a subject's teeth on a display with a processor may include: storing in a memory, a plurality of three dimensional models of the subject's teeth, wherein the plurality of three dimensional models includes a first model that shows the subject's teeth position before receiving treatment, one or more intermediate models that show the subject's teeth position during treatment, and a final model that shows the subject's teeth position after receiving treatment; displaying, using the processor, a staging toolbar on a first portion of the display, wherein the staging toolbar comprises one or more digital buttons that corresponding to the plurality of three dimensional models; displaying, using the processor, a multiple view digital button on a second portion of the display; and displaying, using the processor, on the display both the first model and a second model when the multiple view digital button is selected by a user, wherein the second model is selected from one of the intermediate models or the final model.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIGS. 13A-13C illustrate various single treatment plan views with the occlusal view switched on.

FIGS. 14A and 14B illustrate various dual views with the occlusal view switched on.

DETAILED DESCRIPTION

Figure 1A:
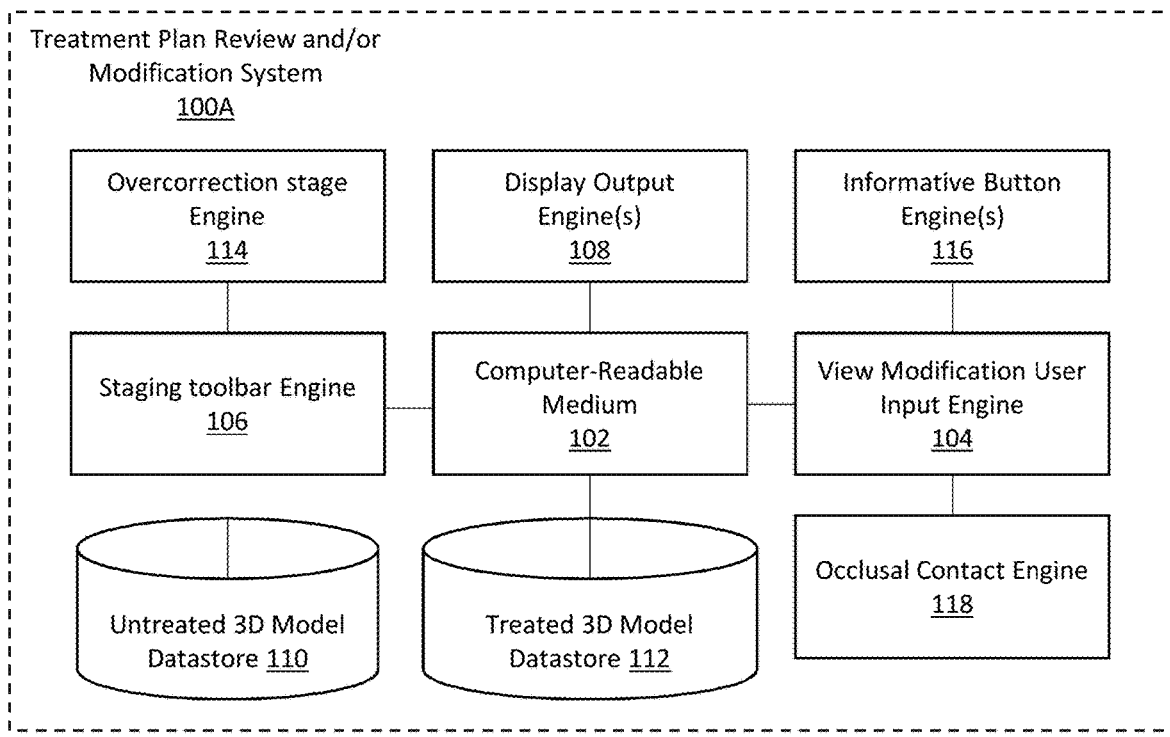
FIG. 1A is a diagram illustrating one example of a treatment plan review and/or modification system as described herein.

Orthodontic devices such as aligners, palatal expanders, retainers, and dental implants can be used to adjust the position of teeth and to treat various dental irregularities. To help the clinician or doctor (i.e., orthodontist) design and plan the subject's treatment plan, a 3D digital model of the subject's teeth, dentition, and gingiva can be constructed from a 3D scan of the subject's mouth, teeth, dentition, and gingiva. The 3D model of the subject's teeth and dentition can be displayed graphically to the doctor on a display using a computing system with memory and software. Input devices such as a mouse and/or keyboard allows the doctor to manipulate the 3D model. The systems and methods described herein are particularly well suited to be used in procedures involving aligners, but the systems and methods are also suitable for use with staging other types of orthodontic devices.

For example, the 3D model of the can be rotated in any axis and can be zoomed into and out as desired. Each individual tooth can be a separate object in the 3D model that can be manipulated by the doctor. From the initial teeth position, the doctor can manipulate the teeth using the input devices into a desired final teeth position. The computer system can then determine the appropriate intermediate stages that can be used to move the teeth from the initial teeth position to the final teeth position. The initial, final, and intermediate teeth position stages can be displayed to the doctor.

One or more graphical toolbars can be displayed to the doctor to facilitate making adjustments to the teeth and arch. The toolbars can have buttons to perform various actions to the 3D model. For example, one toolbar can have buttons that allow the doctor to manipulate the viewing angle and perspective of the 3D model.

Another toolbar can have buttons for making various tooth adjustments, such as extrusion/intrusion, bucco-lingual translation, mesio-distal translation, rotation, crown angulation, bucco-lingual root torque, bucco-lingual crown tip, and mesio-distal crown tip. In some embodiments, when one tooth is adjusted, some or all the other teeth in the same arch will automatically adjust in response. In some embodiments, the doctor can lock and keep a particular tooth at a desired position, and designate a tooth as unmovable for the duration of a treatment (e.g. crowns, implants).

Another toolbar can have buttons for making attachments and precision cuts. These buttons allow the doctor to add conventional attachments and precision cuts by simply dragging and dropping the attachment or cut to the tooth of choice, and the doctor can easily remove attachments and precision cuts by dragging them to the trash can. The buttons also allow the doctor to adjust the placement and rotate conventional attachments, and change the size, prominence and degree of beveling of rectangular attachments. In addition, the button allow the doctor to fine-tune the mesiodistal position of button cutouts.

Another toolbar can have buttons for posterior arch expansion and contraction. This toolbar allows the doctor to expand or contract posterior arches by expanding or contracting the upper arch only, the lower arch only, or both arches. As above, when an arch modification is made on the 3D model, some or all other teeth in the adjusted arch will automatically adjust in response.

Another toolbar can have buttons for interproximal reduction (IPR) and space management. With the IPR and spacing toolbar, the doctor can choose to (1) select the auto adjust option: IPR and space automatically adjusts as you make adjustments on the 3D model; (2) select the keep current option: to preserve the current IPR configuration; (3) select the no IPR option: all existing IPR will be removed, and no IPR will be added; and (4) manually adjust IPR and space on the 3D model (add, remove or lock for specific teeth).

Additional features that can be include in a toolbar include occlusal contacts, which identifies and displays to the doctor all or a subset of inter-arch occlusal contacts, and resolves heavy occlusal contacts directly on the 3D model. Another feature can be dual view, where modifications made using 3D Controls may be compared side-by-side with the original set up. Another feature is a Bolton analysis tool that provides reference information pertaining to tooth size discrepancy that is useful for planning how to address tooth interdigitation and arch coordination. Another tool positions the 3D model on a grid that allows linear tooth movements to be measured and provides more precise control to the doctor to make measurements on the 3D model. Another feature is a superimposition toolbar that superimposes tooth position at any stage in relation to tooth position at any other stage, and control which stage is blue (or another color) and which stage is white (or another different color) for a better visualization between stages.

Dual View

Figure 2A:
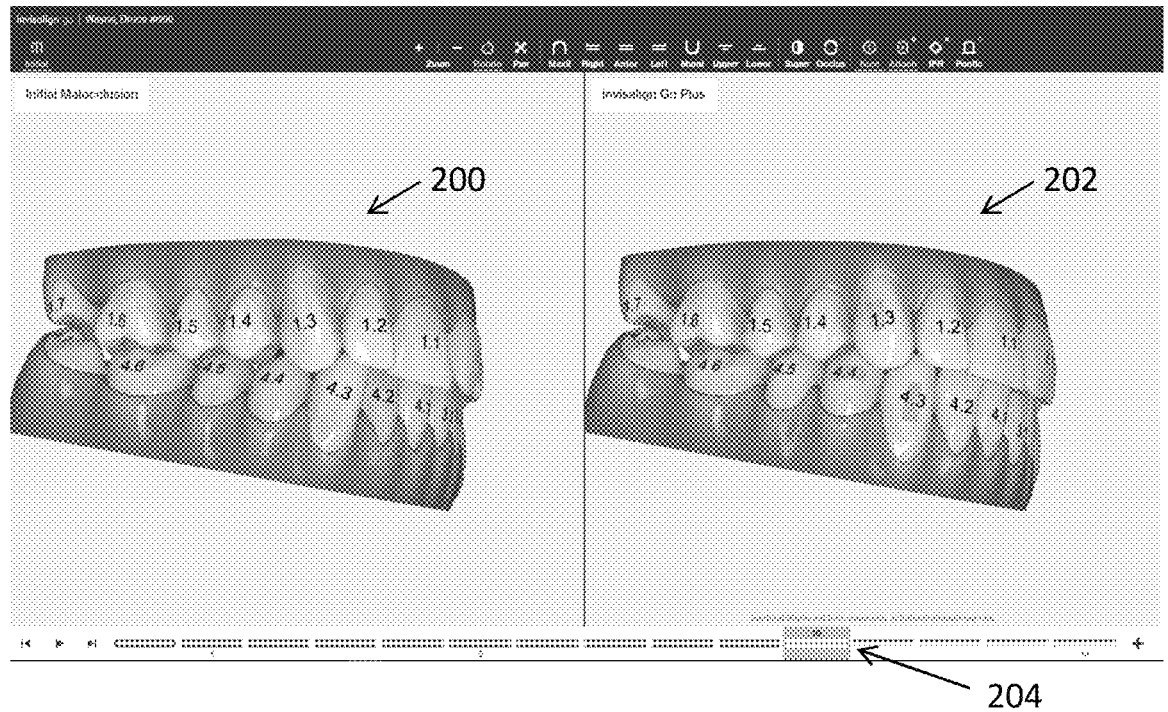
FIGS. 2A-2C illustrate dual and single view display modes for viewing 3D models of a subject's teeth at various stages of a treatment plan.

In some embodiments, the display can provide the doctor a dual view that shows and compares in one screen or display a first 3D model of the teeth position before the treatment (initial malocclusion) with a second 3D model of the teeth position at any stage of the treatment, such as an intermediate stage or the final stage. For example, FIG. 2A illustrates in the first 3D model 200 on the left side of the display the initial malocclusion, while the right side of the display shows a 3D model 202 of the dentition at the $10^{th}$ stage of treatment. A toolbar 204 at the bottom of the screen allows the doctor to select the stages to be displayed in dual view. The stages to be viewed can be selected by simply clicking the corresponding button on the toolbar 204. In some embodiments, a default stage that is typically shown is the initial stage that shows the initial malocclusion. In some embodiments, the default stage can be changed to an intermediate stage. For example, the doctor can drag and drop a button representing one of the intermediate stages over the default 3D model shown on the left side of the screen in order to replace the initial stage with an intermediate stage. Using dual view the doctor can understand how the treatment goes from stage to stage in comparison to the initial malocclusion. In some embodiments, the first 3D model can be an intermediate stage and the second 3D model can be a subsequent intermediate stage or the final stage.

Using additional tools in the dual view gives the doctor additional details for the treatment in comparison to the initial malocclusion and teeth position and allows the doctor to view the effect of a particular action on teeth movement on any particular stage and allows the comparison between the initial malocclusion with any stage of the treatment. Any of the tools described herein can be used in dual view to manipulate either of the 3D models shown in dual view. For example, using the occlusal view tool when in dual view gives the doctor the ability to view and compare maxillary and mandibular occlusal view for the initial malocclusion with the maxillary and mandibular occlusal view at any stage of the treatment.

Using other tools (e.g., Attachments, IPR, Pontic) in dual view gives the doctor additional information about the used features for the treatment and in comparison to the initial malocclusion, and the doctor can more easily and quickly analyze how these features work and whether there is a clinical reason to use them for this particular treatment.

FIG. 1A is a diagram showing an example of a treatment plan review and/or modification system 100A. The modules of the system 100A may include one or more engines and datastores. A computer system can be implemented as an engine, as part of an engine or through multiple engines. As used herein, an engine includes one or more processors or a portion thereof. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors or a first engine and a second engine can share one or more processors with one another or other engines. Depending upon implementation-specific or other considerations, an engine can be centralized or its functionality distributed. An engine can include hardware, firmware, or software embodied in a computer-readable medium for execution by the processor. The processor transforms data into new data using implemented data structures and methods, such as is described with reference to the figures herein.

The engines described herein, or the engines through which the systems and devices described herein can be implemented, can be cloud-based engines. As used herein, a cloud-based engine is an engine that can run applications and/or functionalities using a cloud-based computing system. All or portions of the applications and/or functionalities can be distributed across multiple computing devices, and need not be restricted to only one computing device. In some embodiments, the cloud-based engines can execute functionalities and/or modules that end users access through a web browser or container application without having the functionalities and/or modules installed locally on the end-users' computing devices.

As used herein, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described herein.

Datastores can include data structures. As used herein, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure. The datastores, described herein, can be cloud-based datastores. A cloud-based datastore is a datastore that is compatible with cloud-based computing systems and engines.

An example of a treatment plan review and/or modification system 100A such as that shown in FIG. 1A may include a computer-readable medium 102, view modification user input engine(s) 104, staging toolbar engine(s) 106, display output engine(s) 108, an untreated 3D model datastore 110, one or more treated 3D model datastore(s) 112, an overcorrection stage engine 114, an informative button engine 116, and an occlusal contact engine 118. One or more of the modules of the system 100A may be coupled to one another (e.g., through the example couplings shown in FIG. 1A) or to modules not explicitly shown in FIG. 1A. The computer-readable medium 102 may include any computer-readable medium, including without limitation a bus, a wired network, a wireless network, or some combination thereof.

The view modification user input engine(s) 104 may implement one or more automated agents configured to receive user input on the position and/or orientation of a displayed 3D model of a subject's teeth. The system may coordinate (e.g., as part of a view coordination engine, not shown) the display of each of the 3D models concurrently being displayed so that changes in one model by the user are reflected in all or some of the other models, including changes in the position, etc. In various implementations, the view modification engine(s) 104 may implement one or more automated agents configured to coordinate (in conjunction with the display output engine(s) 108) the 3D virtual representations of the patient's dental arches.

In some variations, the view modification user input engine includes digital controls (e.g., digital buttons), such as the informative buttons (and may therefore interact with the informative button engine 116). In some variations one or more buttons may include, for example, tooth numbering. Tooth numbering may be determined by the system or may be read as information about the tooth numbering in each 3D model (e.g., stored as part of the 3D model datastores). For example, a 3D model datastore (e.g., untreated 3D model or treated 3D model datastore) may be configured to store one or more tooth type identifiers of different tooth types. In some implementations, the tooth type identifiers correspond to numbers of a Universal Tooth Numbering System, character strings to identify tooth types by anatomy, images or portions thereof to identify tooth types by geometry and/or other characteristics, etc.

The staging toolbar engine 106 coordinates the user selection of one or more stages of the treatment plan represented by one or more of the 3D digital models of the subject's teeth. The stating toolbar engine may map selected staging buttons (e.g., buttons labeled numerically and/or alphanumerically with one or more treatment stage indicators) to the display of a corresponding stage in each of the 3D models (or in comparison to the untreated 3D model).

In general, the display output engine 108 is configured to coordinate the display of 3D model(s) of the subject's teeth with each other and with changes made by the user (e.g., physician, doctor, dentist, dental technician, etc.).

The overcorrection stage engine 114 may determine and/or coordinate display of one or mover overcorrection stages, as will be described in greater detail below.

An informative button engine 116 may coordinate the use of one or more informative buttons that may be modify the information specific to each (or all) of the treatment plan 3D digital models and may process this information into a user-selectable button that both shows the status of the button (e.g., on/off) as well as information that is based on all or a subset of the treatment plans, including that all or some of the treatment plan includes one or more features (e.g., treatment features, such as interproximal reduction (IPR), attachments, hooks, tooth ramps, etc.).

The system may include one or more datastores, including an untreated 3D (digital) model datastore 110 that may store the 3D model of the patient's untreated teeth, e.g., upper and/or lower arch. The 3D model of the patient's untreated teeth may be imported (e.g., from an external file, remote server, etc.), scanned, e.g., using an intraoral scanner from a patient or a model of a patient's teeth and stored, or otherwise acquired by the system. Similarly, the system may include a treated 3D (digital) model datastore 112 for storing one or more 3D models of the patient's teeth during each stage of a treatment plan, including the final stage. The datastore may also store information specific to the treatment plan, including features used to achieve tooth movement (including location on the teeth, etc.), number of stages, etc., or any other meta-information related to the referenced treatment plan. The treated 3D (digital) models may be generated by the system or a separate system and imported/entered into the datastore. Any number of treatment 3D models (1, 2, 3, 4, 5, 6, 7, 8, 9, 10, etc.) may be stored and used, including selection by a user of which ones to show or display.

Figure 1B:
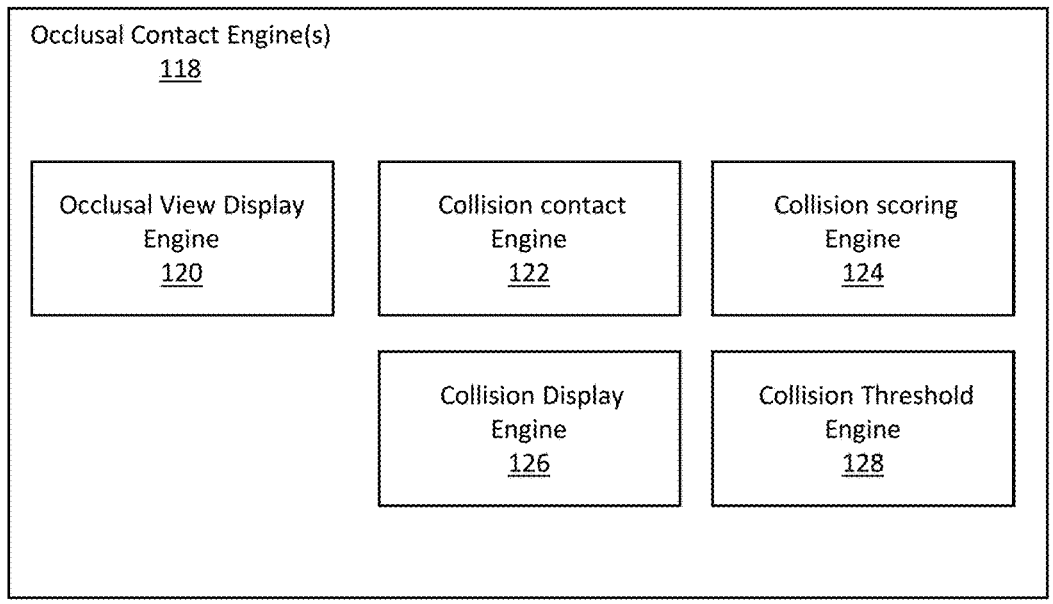
FIG. 1B is a diagram illustrating one example of an occlusal contact engine as described herein.

Any of these systems may also include an occlusal contact engine 118. FIG. 1B shows a schematic example of another type of occlusal contact engine 118. In this example the occlusal contact engine may be invoked by a user command (e.g., selection of a user input such as a digital button, switch, etc.). The occlusal contact engine may include an occlusal view display engine 120 that may receive an instruction to switch between a current view of one or more digital model(s) (e.g., a plurality of concurrently displayed digital models) into a view showing occlusal surfaces of one or both upper and/or lower arch surfaces. The system may translate the current 3D model display(s) into occlusal views, with the upper and lower arch, when both are shown concurrently, arranged with the upper arch above the lower arch, and both spread essentially flat. The occlusal contact engine may also include a collision contact engine 122 for calculating (or receiving from an outside source that has already pre-calculated) the occlusal contact between the teeth of the upper and lower jaws. The collision contact engine may estimate, from the 3D models, the normal intercuspation for each of the upper and lower jaws, and may determine where the intercuspation results in collision or contact between the teeth of the upper jaw and the teeth of the lower jaw. Both location and severity of collision may be estimated by the collision contact engine. If the collisions are predetermined and passed to the occlusal contact engine, they may be stored in an equivalent datastore (e.g., a collation contact datastore, not shown); alternatively the collision contact information calculated by the collision contact engine may be stored in a collision contact datastore. A collision scoring engine 124 may score the extent of the collision between the teeth of the upper and lower arch during intercuspation. The score may be qualitative and/or quantitative. The scoring engine may apply a threshold (e.g., from the collision threshold engine 128) to determine if a collision is mild, extreme, etc. The scoring engine may apply a threshold based on, e.g., a patient set threshold. For example, the collision threshold engine 128 may present a control on the display that the user may adjust to set or change the threshold (this may be reflected dynamically in real time in the display of the occlusal collisions). The occlusal contact engine may also include a collision display engine 126 that coordinates the display of the determined collisions onto the 3D model(s) of the patient's teeth. For the treatment plan 3D models the occlusion(s) may be graphically illustrated on all of the treatment stages or in just the last (e.g., final) treatment stage(s).

Any of these systems may also include a modification engine (not shown) configured to receive user modification of one or more treatment plans, which may be used to submit for the generation of new treatment plan(s). Any of these system may also include a final approval and fabrication engine(s), not shown. An aligner fabrication engine(s) may implement one or more automated agents configured to fabricate an aligner. Examples of an aligner are described in detail in U.S. Pat. No. 5,975,893, and in published PCT application WO 98/58596, which is herein incorporated by reference for all purposes. Systems of dental appliances employing technology described in U.S. Pat. No. 5,975,893 are commercially available from Align Technology, Inc., Santa Clara, Calif., under the tradename, Invisalign System. Throughout the description herein, the use of the terms "orthodontic aligner", "aligner", or "dental aligner" is synonymous with the use of the terms "appliance" and "dental appliance" in terms of dental applications. For purposes of clarity, embodiments are hereinafter described within the context of the use and application of appliances, and more specifically "dental appliances." The aligner fabrication engine(s) 108 may be part of 3D printing systems, thermoforming systems, or some combination thereof.

Figure 2B:
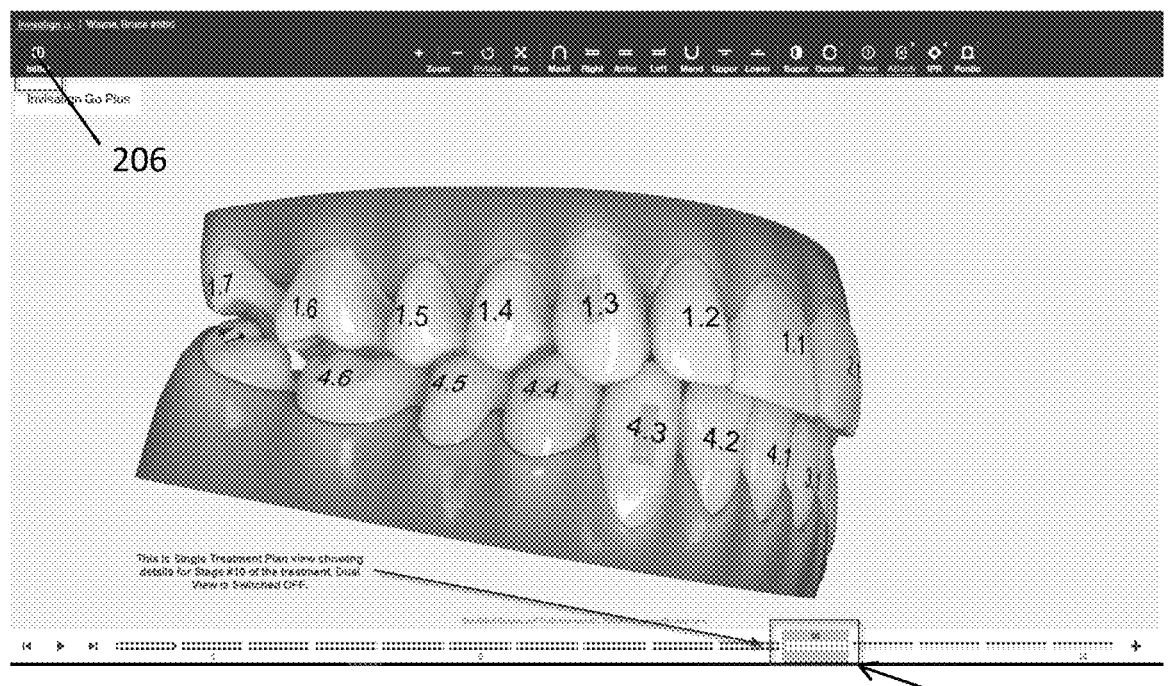
Figure 2C:
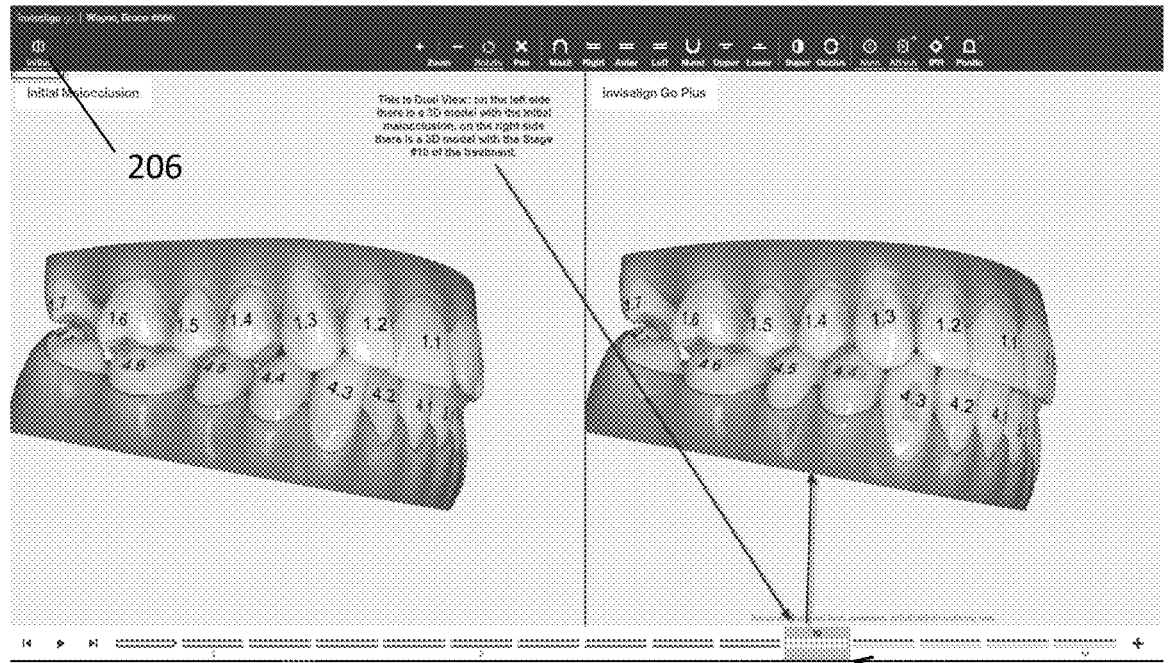

FIGS. 2B and 2C illustrate a tool button 106, shown in the upper left corner of the display in this embodiment, for toggling the display between dual view and single view. In FIG. 2B, the dual view button 206 is not selected and the stage 10 button is selected in the stage selection toolbar 204, which results in stage 10 of the treatment plan being shown in the display in single view mode. In FIG. 2C, the dual view button 206 has been selected along with stage 10 in the stage selection toolbar 204 to show the initial malocclusion on the left hand side and stage 10 and the right side of the display.

Figure 3:
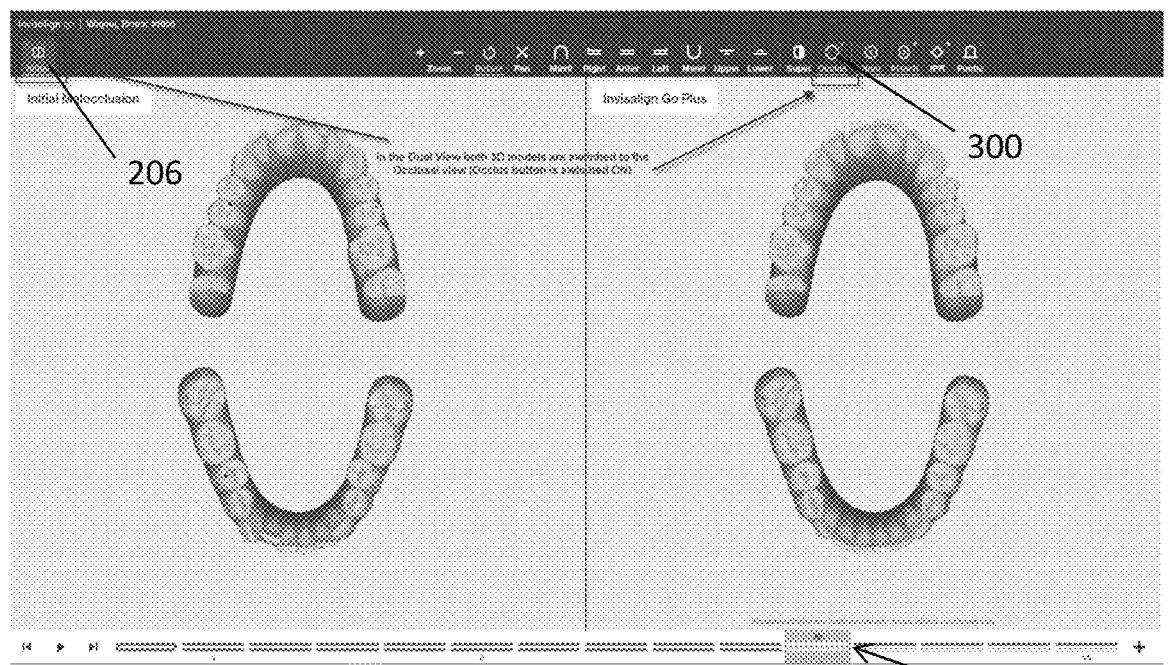
FIG. 3 illustrates a dual view that can be combined with an occlusal view.

FIG. 3 illustrates dual view combined with an occlusal view that can be selected by toggling an occlusal view button 300. In FIG. 3, the dual view button 206 and the occlusal view button 300 have been selected along with the button for stage 10 in the stage selection toolbar 204. This results in the occlusal contacts of the dentition in the initial malocclusion to be shown and compared with the occlusal contacts of stage 10.

Figure 4:
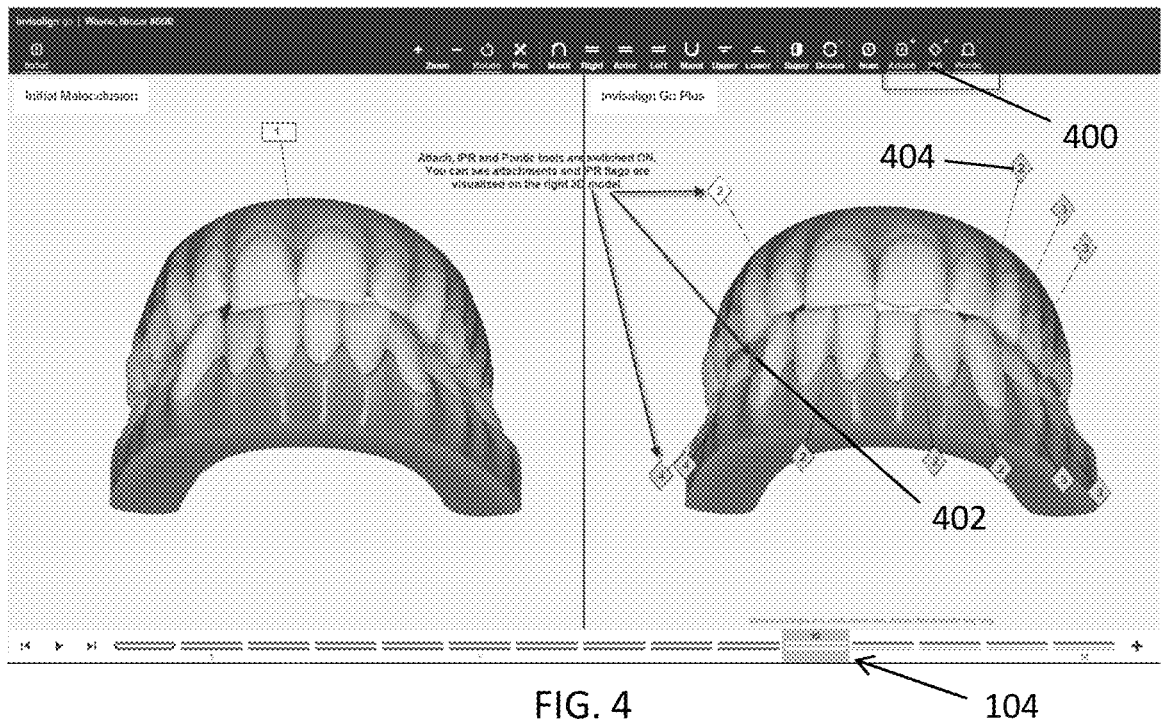
FIG. 4 illustrates the ability to hide and visualize features in dual view.

FIG. 4 illustrates that in the dual view mode, the doctor is able to visualize or hide attachments 402 and other aligner features, IPR/space information 404 for the teeth contacts, and pontics using Attach, IPR and Pontic buttons 400 on the toolbar in order to analyze how these features are used for the particular treatment and what these features help to treat and whether addition, removal, or adjustment of any of these features help with the treatment plan. Dual view in this case helps the doctor visualize and analyze this information in comparison to the initial malocclusion view:

In the dual view mode, the doctor is able to switch the right 3D model to any stage of the treatment using staging toolbar 204 at the bottom of the window in order to visualize and compare treatment details of the desired stage to the initial malocclusion (i.e., initial teeth position). As shown in FIG. 4, stage 10 is selected by selecting the #10 button on the staging toolbar 204.

Tools with Additional Indicators

In some embodiments, when the doctor reviews a case with multiple treatment plans available, multiple treatment plans (MTP) can be shown in one screen. The doctor can also select one of the plans to obtain further details of the plan and switch to a single plan view. The various features used or not used in the various treatment plans, such as attachments, IPR/spaces, pontics and/or information about occlusal contacts, can be shown simultaneously in the multiple view mode as shown in FIGS. 5A-5H.

Tools, such as toolbars with icons and button with special indicators, can indicate to the doctor whether a particular feature is present or absent in the plan/plans shown in the screen. Even if the doctor switches some features visualization OFF, he/she will clearly understand by indicator's color whether this feature is used in the treatment or absent. For example, if a feature is used in the treatment, the indicator for that feature (e.g., a circle, square, triangle, or other shaped object on the button) can be colored and filled in, and when the feature is not used, the indicator can be empty and uncolored.

This information is especially useful in the MTP view when the doctor is switching between alternative treatment plans using filters with clinical parameters and features. The state of the tool buttons for the various features allows the doctor to quickly determine whether that feature is present or absent in a particular treatment plan. For example, if in the previous search some features were absent (indicator is empty or uncolored and for example tool is switched OFF), but in the new search this feature is present (the tool button still is switched OFF but the indicator shows that the feature is present now because the indicator becomes colored), the doctor will see a changed indicator and will understand if he needs to review details regarding the changed feature, and the related feature tool may be switched ON to visualize this information on the 3D model.

Figure 5A:
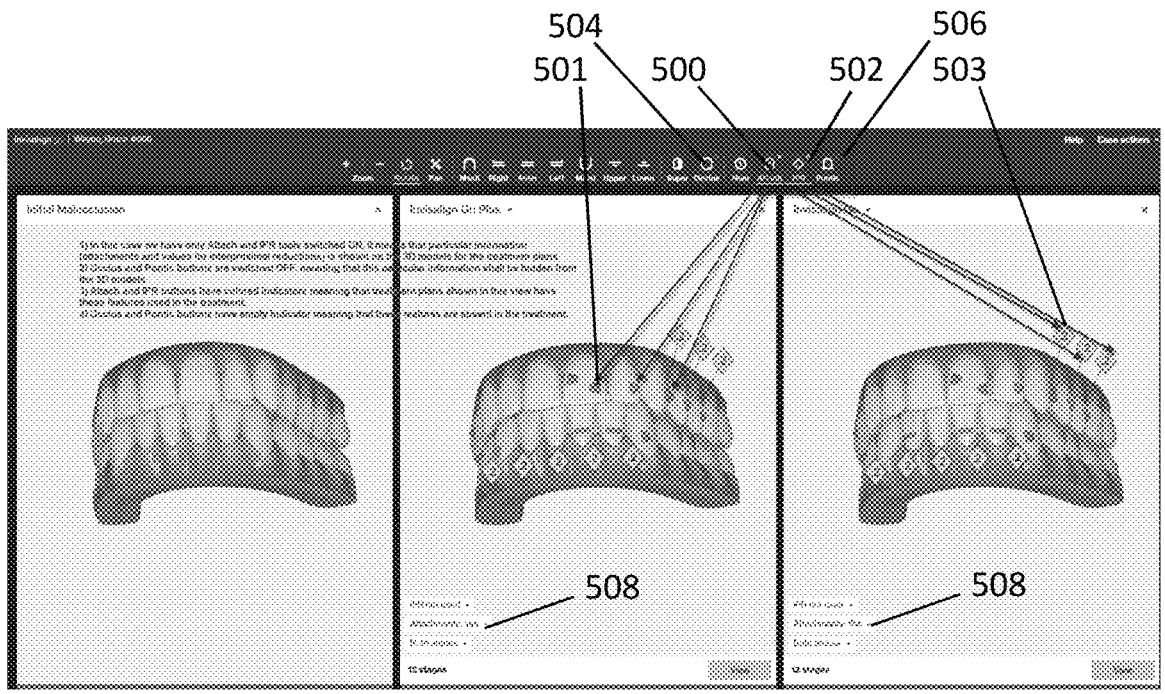
FIG. 5A-5G illustrate viewing multiple treatment plans and various features that can be used during treatment.

In FIG. 5A, the attachment filter 508 is set to "yes" which means that attachments are used in the treatment plans, and the attach tool/button 500 and the IPR tool/button 502 is switched ON, which means that information for those features (i.e., attachments 501 and values for interproximal reductions 503) are shown on the 3D models for the treatment plans. In addition, the occlus tool/button 504 and pontic tool/button 506 are switched OFF, meaning that information for those features are hidden and not displayed on the 3D models. Furthermore, the attach tool/button 500 and the IPR tool/button 502 have filled/colored indicators (shown on the button as a filled circle) which means that the treatment plans shown in these views have these features used in the treatment. In contrast, the occlus tool/button 504 and the pontic tool/button 506 have an empty indicator (shown on the button as an empty circle) which means that these features are absent in the shown treatment plans.

Figure 5B:
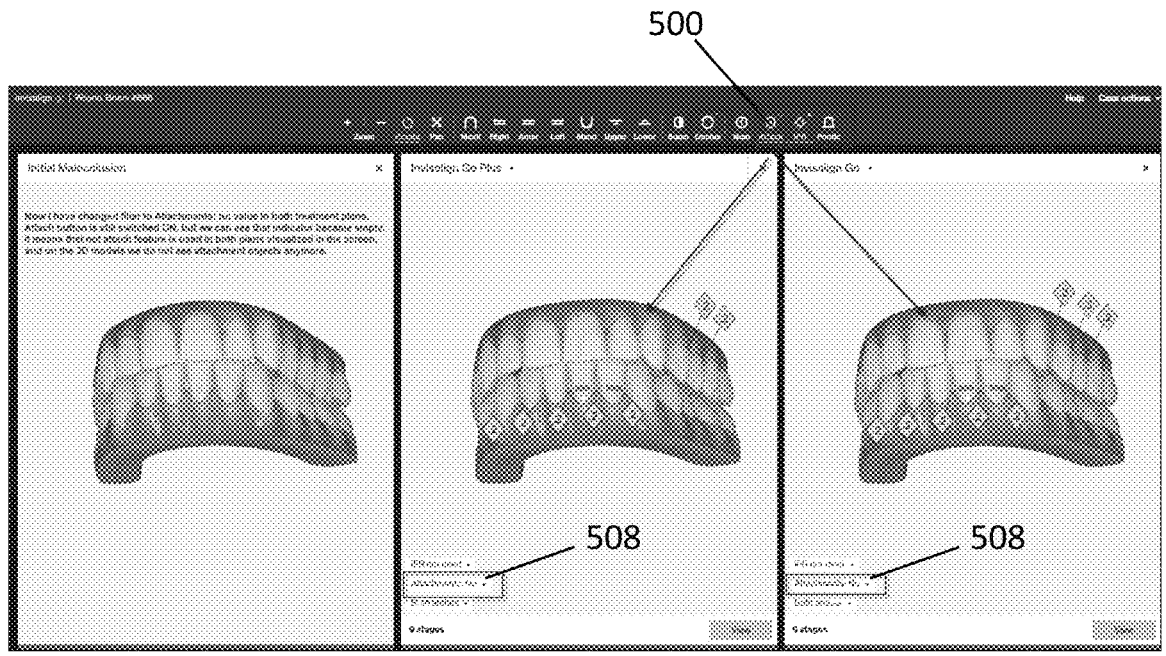

In FIG. 5B, the attachment filter 508 has been set to "no" in both treatment plans, which means that attachments aren't used in the treatment plans. Consequently, although the attach tool/button 500 is still switched ON, the attach tool/button 500 indicator is empty, which means that attachments are not used in either plan, which is confirmed by visualization of the 3D models which do not show attachment object anymore.

When the MTP case is opened, in some embodiments by default all features present in any treatment plan selected for the MTP view will be visualized on the 3D models and related tools will be switched ON by default. These tools also have a colored indicator, meaning that these features are used in one of the treatment plans shown or in all plans shown in the MTP view.

Figure 5C:
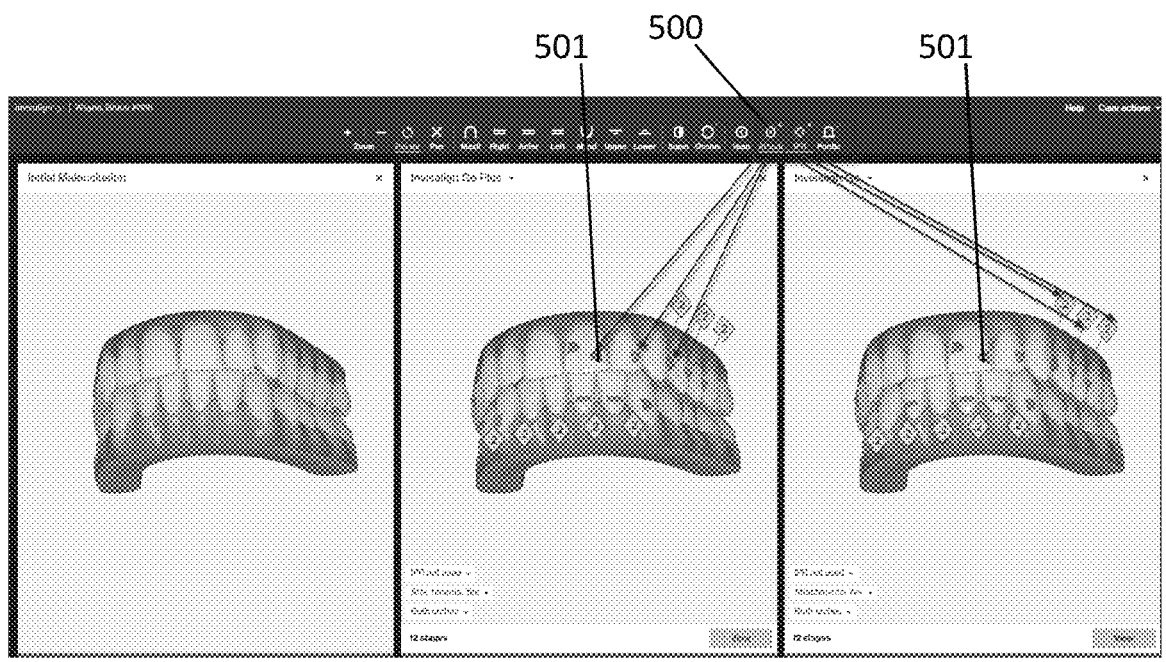
Figure 5D:
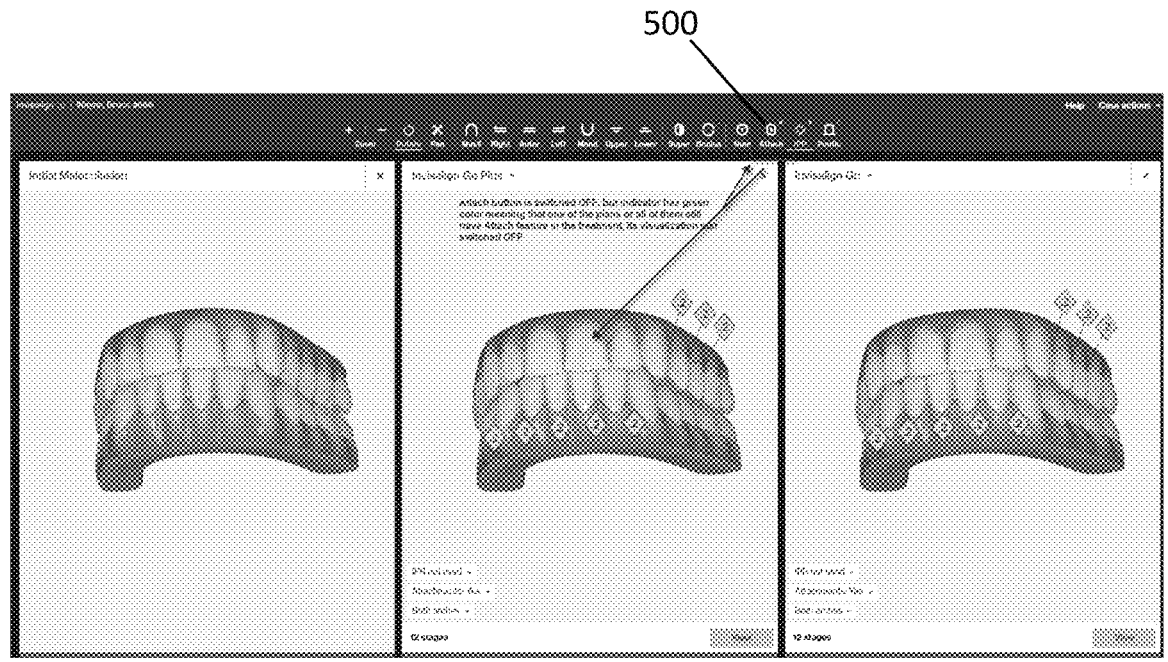

FIGS. 5C and 5D illustrate how a particular feature can be hidden or removed from the 3D model even though the feature is present in the treatment plan. This can be useful for simplifying the view of the 3D model when focusing on another feature. For example, in FIG. 5C, the attach button 500 is selected "ON" (indicated by the colored icon on the button) and the attach button indicator is filled which means that attachments 501 are present in the treatment plan and viewable on the 3D model since the attach button 500 is "ON". As shown in FIG. 5D, to hide the attachments 501 from 3D models, the attach button 500 can be switched "OFF" by clicking the button to toggle the button from one state to another. Note that the attach button indicator is still filled and colored, which means that the attachment features are present in the treatment plans even if their visualization in the 3D models is switched OFF. Similarly, other features can be hidden as well by toggling the feature button to an OFF state.

Figure 5E:
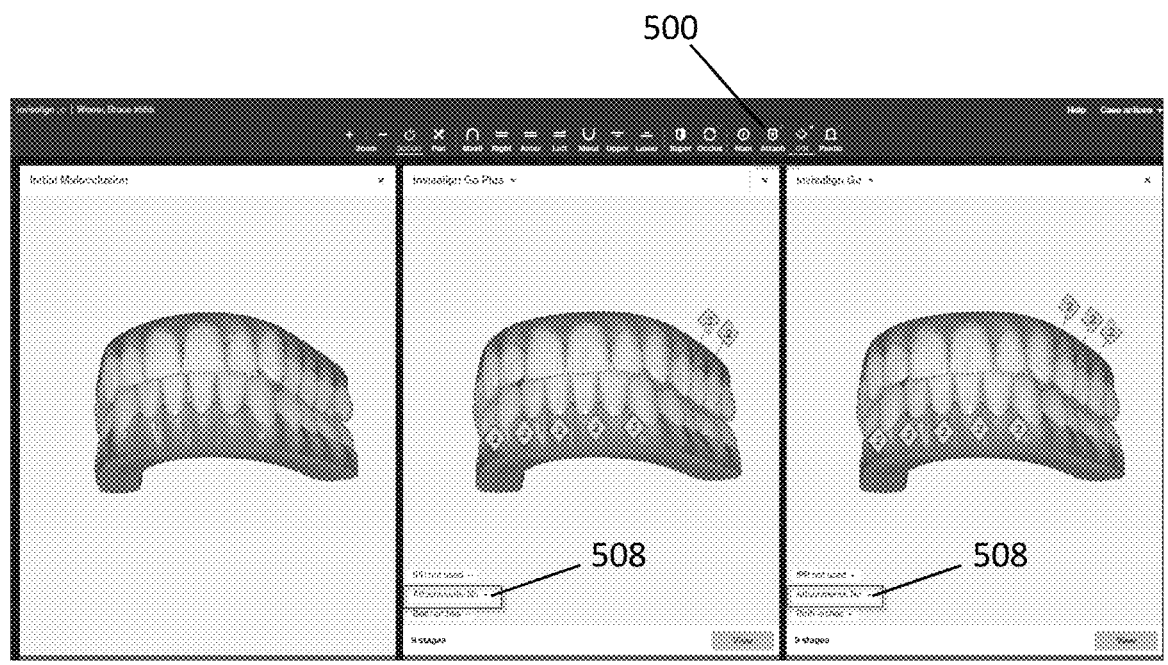
Figure 5F:
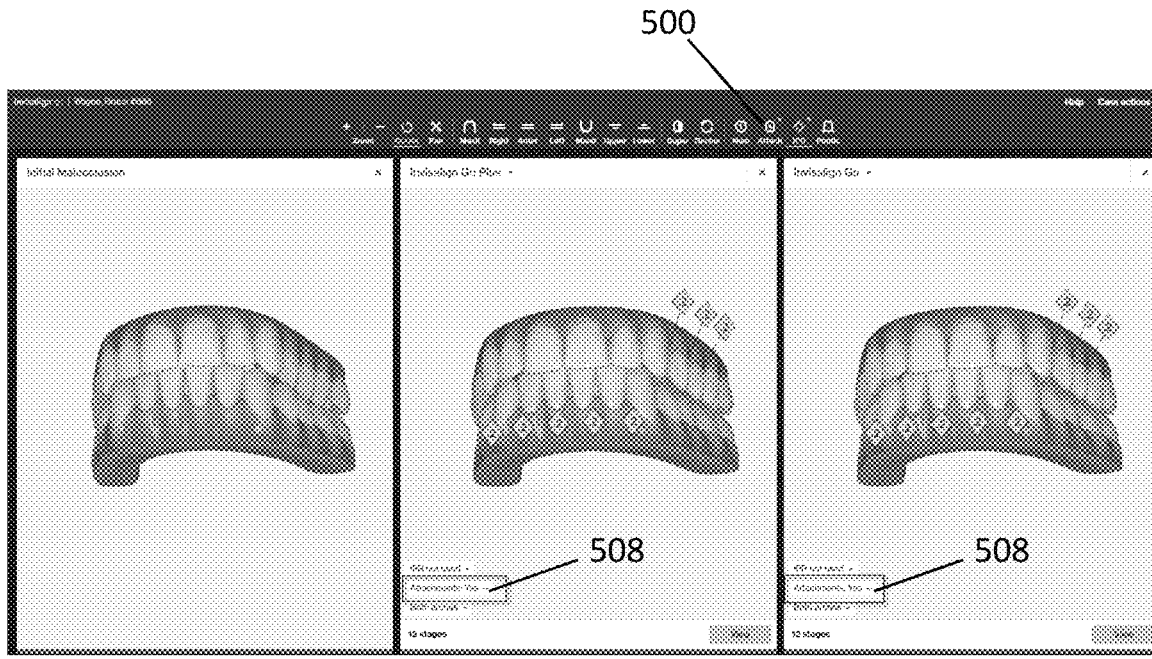
Figure 5G:
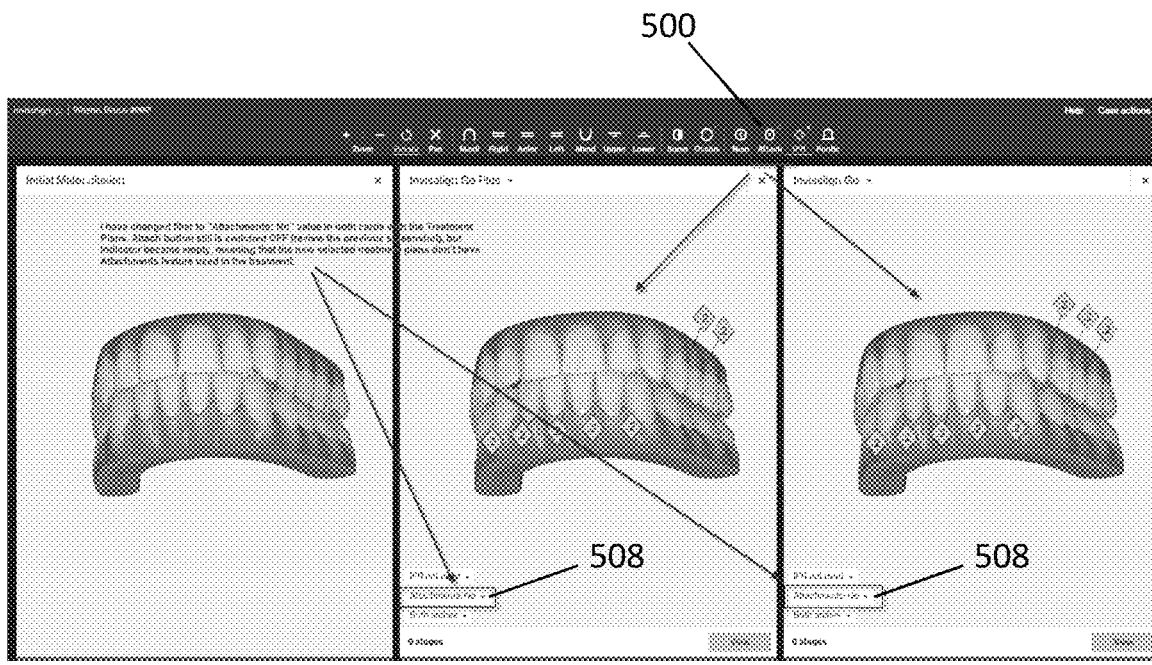

FIGS. 5E-5G illustrate how filters can be used to select treatment plans using or not using various features, such as attachments and IPR. The use of a feature in a treatment plan can be quickly determined by looking at the feature indicators (filled indicator means feature used and empty indicator means feature not used). For example, in FIG. 5E, the attachment filter 508 is be set to "No", which causes the attach button 500 indicator to be empty, which means attachments are not being used in the treatment plans. In FIG. 5F, the attachment filter 508 is changed to "Yes", which causes the attach button 500 indicator to be filled, meaning attachments are used in the treatment plan but are not shown in the model because the attach button 500 is deselected. In FIG. 5G, the attachment filter 508 is changed back to "No", which causes the attach button 500 indicator to revert back to being empty as in FIG. 5E, meaning attachments are not used in the treatment plans.

In some embodiments, tool button states are not changed when searching/filtering for specific treatment plans. Therefore, if a tool button is in an "OFF" state, it will keep that "OFF" state for the new searched/filtered plans. Similarly, if the tool button is in an "ON" state, it will keep the "ON" state for the new searched/filter plans. However, the indicators for those buttons will change between filled and empty to indicate whether the feature is present or absent from the new searched/filtered treatment plans.

Figure 6A:
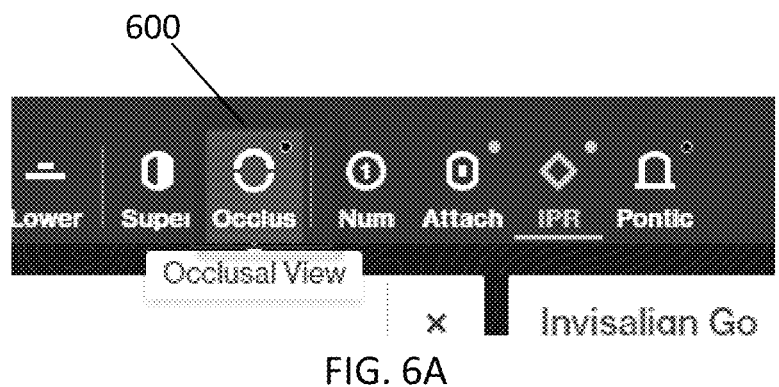
FIGS. 6A-6C illustrate an occlusal view button with three indicator states.
Figure 6B:
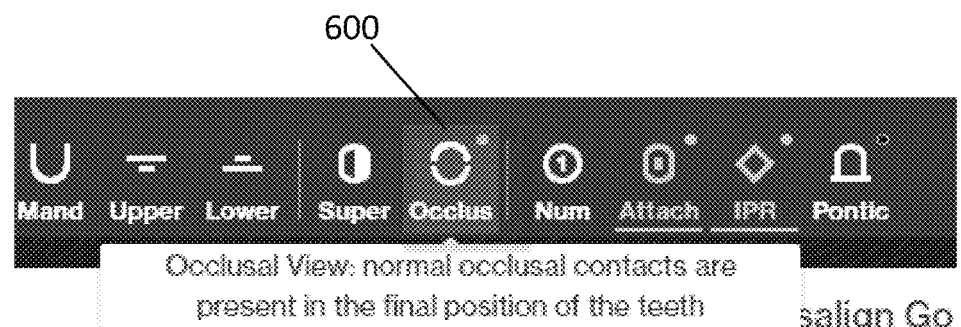
Figure 6C:
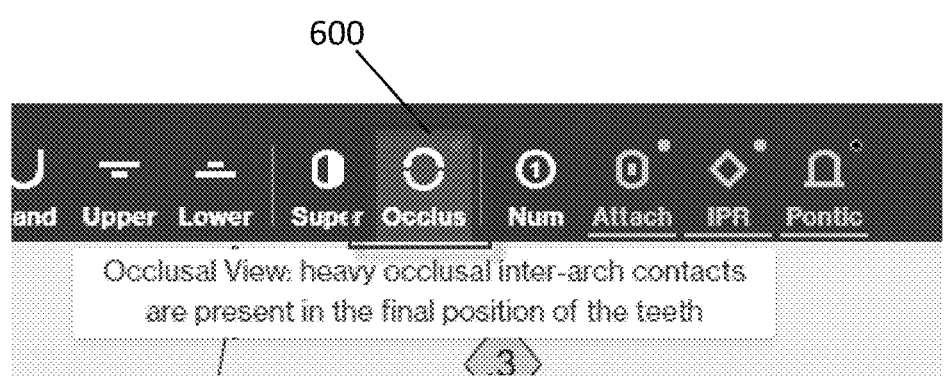

In some embodiments, one or more feature button can have an indicator with more than 2 states, such as 3 states. For example, FIGS. 6A-6C illustrate the 3 states of the occlus button 600. In FIG. 6A, the occlus button 600 has an empty indicator which means that there are not any normal occlusal contacts or heavy interarch collisions. In FIG. 6B, the occlus button 600 has a green indicator which means that the treatment plans shown in the screen have only normal occlusal contacts. In FIG. 6C, the occlus button 600 has a red indicator which means that the treatment plans have heavy inter-arch collisions.

Figure 7A:
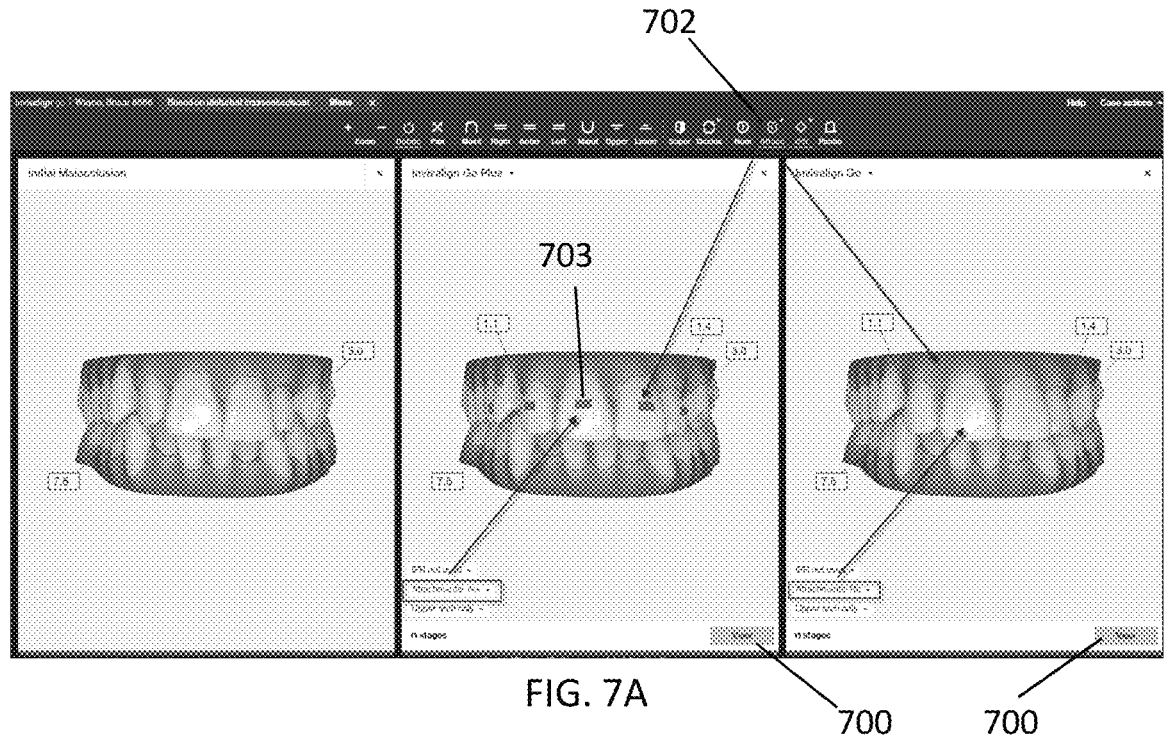
FIGS. 7A and 7B illustrate how to switch between a view of multiple treatment plans and a view of a single treatment plan.
Figure 7B:
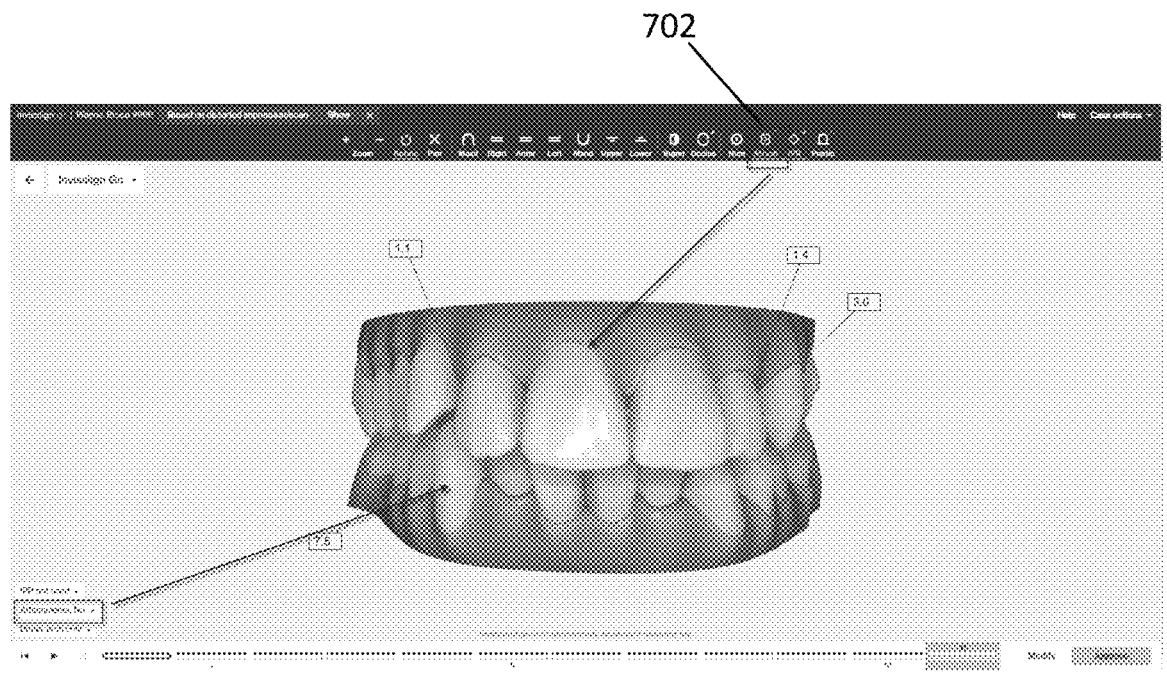

As shown in FIGS. 7A and 7B, when the doctor wants to review details for one of the treatment plans shown in the MTP view and clicks on the view button 700, the selected treatment plan will be opened in the single treatment plan (STP) view. Toolbar buttons state (switched ON or switched OFF) will not be changed but indicators can be changed to show actual information about features availability for this particular plan. For example, in the MTP view in FIG. 7A, only one of the treatment plans had attachments 703 used in the treatment. In the MTP view, the toolbar showed a green indicator for attach button 702 because one of the plans has attachments 703. Switching to the STP view shown in FIG. 7B for the plan which doesn't have attachments used in the treatment, the attach button 702 won't change its state, but its indicator shall become empty because the selected plan does not have this feature used in the treatment.

Visualization of Overcorrection Stages

Figure 8A:
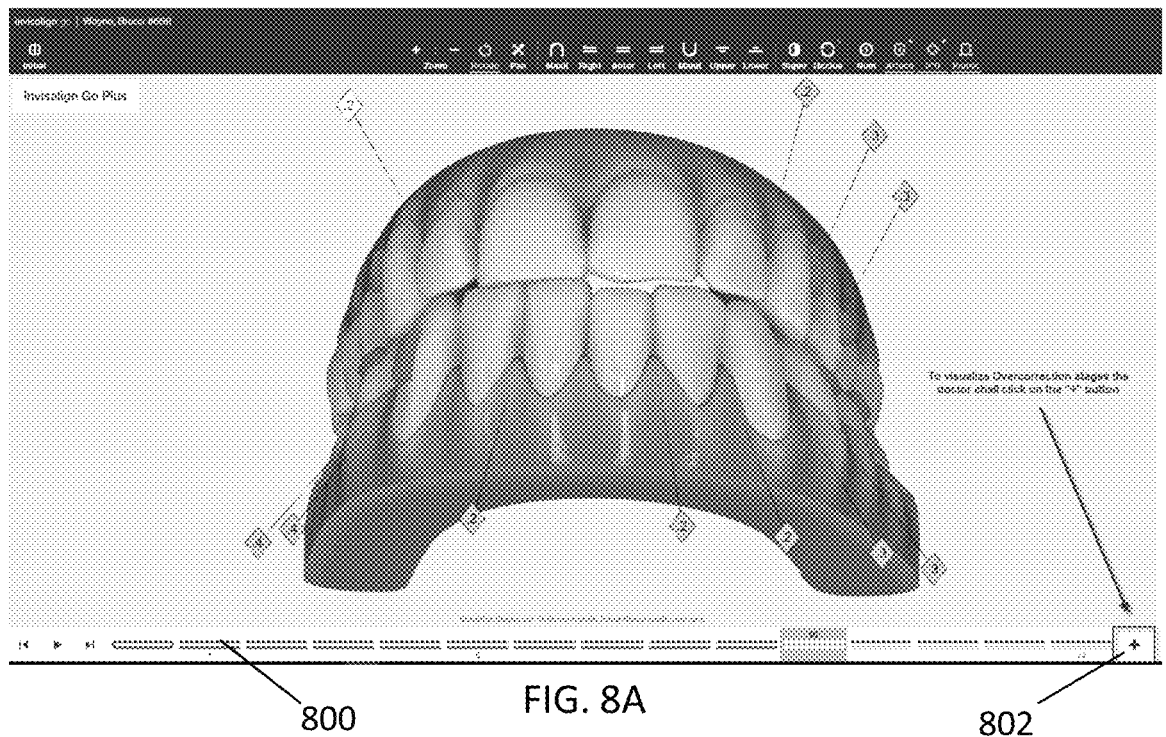
FIGS. 8A and 8B illustrate overcorrection stages that can be hidden and unhidden.
Figure 8B:
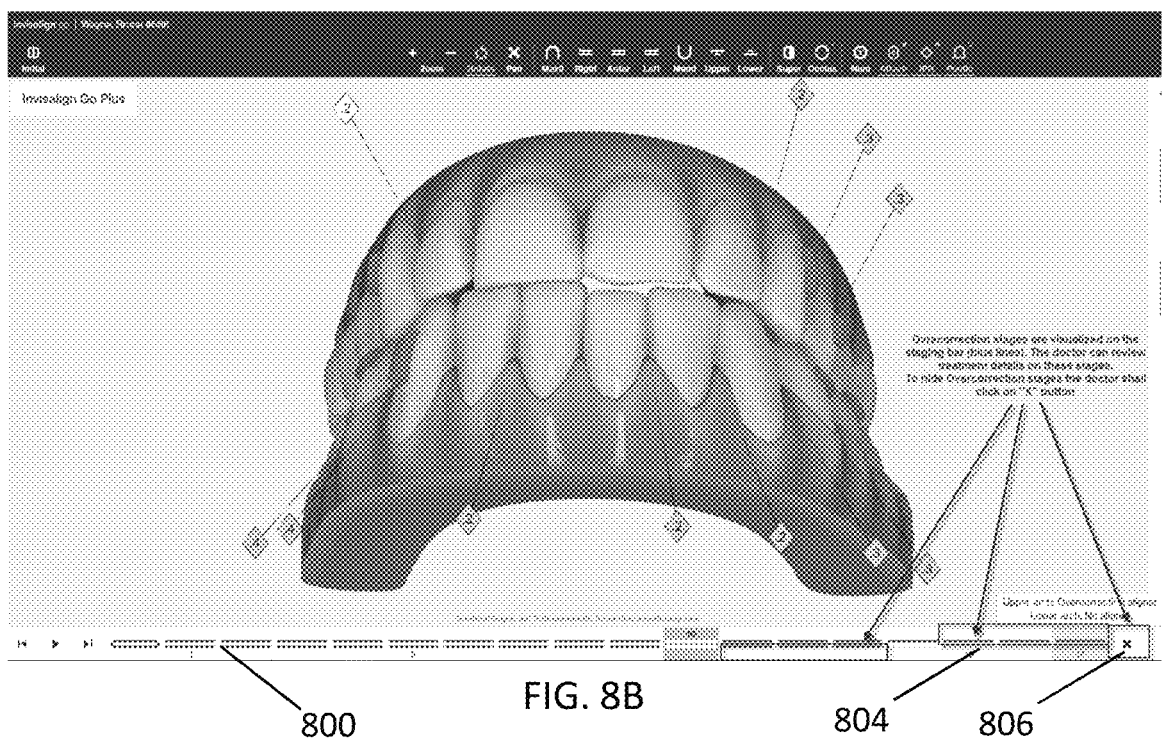

In some embodiments, as shown in FIGS. 8A and 8B, the doctor can visualize or hide overcorrection stages in the treatment using a tool/button placed next to or integrated into the end of the staging toolbar 800 that represents the treatment stages. In FIG. 8A, the overcorrection stages are hidden and a "+" button 802 can be clicked or selected to unhide and show the overcorrection stages in the staging toolbar 800. In FIG. 8B, the overcorrection stages 804 are visible in the staging toolbar 800 as blue lines (although other colors or patterns can be used to distinguish the overcorrection stages from the other stages). The doctor can review the details of the overcorrection stages 804 or the normal stages by selecting the stage using the staging toolbar 800. An "X" button 806 can be clicked or selected to hide the overcorrection stages.

Figures 9, 10:
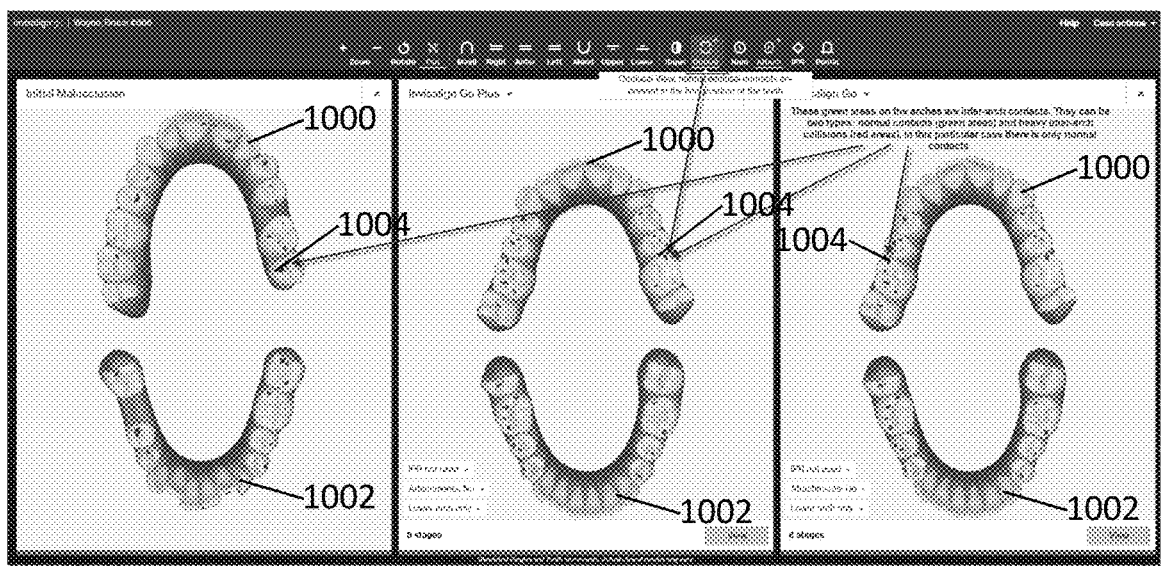
FIG. 9 illustrates a treatment form that can be used to prompt the doctor about overcorrection stages.
FIG. 10 illustrates an embodiment of a multiple treatment plan view with occlusal view switched on to display occlusal contacts.

In some embodiments, an overcorrection technique is used for example for virtual c-chain with aligners which simulates the effect of using elastic c-chains in bracket and wire treatments. In some embodiments, a treatment form can be displayed on the screen as shown in FIG. 9 to the doctor as a prompt or reminder for asking about and/or using overcorrection stages. In some embodiments, overcorrection stages are used to provide additional (extra) forces for specific tooth movements. In some embodiments, in the overcorrection stages teeth continue moving in the same direction as originally planned. They are requested for some particular teeth movements in order to achieve ideal treatment results.

Occlusal View and Occlusal Contacts Visualization

As shown in FIG. 10, the system can display on a screen an occlusal view of the subject's dentition in an open mouth configuration where the upper arch 1000 is shown on the top of the screen and the lower arch 1002 is shown at the bottom of the screen, and this view can be combined and overlaid with the inter-arch contacts 1004 visualization which are shown in the figure as colored (e.g., green for normal occlusal contacts and red for heavy inter-arch collisions) areas on the teeth. Using this view the doctor can clearly see teeth alignment for both arches in the initial teeth position, shown in FIG. 10 on the left, in final teeth position and in any stage of the treatment, shown in FIG. 10 in the middle and on the right. In addition to this information the doctor also can visualize and investigate inter-arch contacts on both arches simultaneously.

Occlusal contacts 1004 visualization on the initial teeth position are very important and may be critical for doctors to verify that the bite has been set correctly. After this feature implementation the doctors have a special tool to check that the initial bite setup is correct based on the pattern of occlusal contacts.

Occlusal contacts visualization on the final teeth position gives the doctor an understanding of whether the treatment will be efficacious and whether the subject will have or not have heavy inter-arch contact collisions after the treatment. Based on this information the system or doctor can decide whether the treatment requires modifications to fix such problems or whether the treatment is satisfactory and can be continued.

As shown in FIG. 10, in multiple treatment plans view the doctor is also able to visualize and compare under the occlusal views the inter-arch contacts for the initial malocclusion and for the final (or intermediate) teeth positions for two different treatment plans that are selected for comparison.

The combination of the occlusal view with the inter-arch contacts visualization gives the doctor the ability to check both arches teeth alignment and analyze inter-arch contacts information simultaneously.

Such views allow the doctor to check inter-arch contacts in the initial teeth position to check if the initial bite setup was done correctly or not.

Such views allow the doctor to check inter-arch contacts in the final teeth position in order to make sure that the treatment is proper and efficacious and does not have any major issues that would prohibit going forward with the treatment plan. Otherwise, if for example heavy inter-arch contacts are present, the doctor is able to modify the treatment plan to fix and eliminate such issues from the approved treatment plan.

In the multiple treatment plans view the doctor is able to view and compare the occlusal view and inter-arch contacts in initial teeth position and in the final teeth position for two different treatment plans that are selected for comparison.

In the single treatment plan view the doctor is also able to view inter-arch contacts on any stage of the treatment. This additional information gives the doctor a fuller understanding of what will happen with the inter-arch contacts during the course of the treatment and whether the treatment plan should be modified or corrected in the middle of the treatment or before beginning treatment.

When the case has heavy inter-arch collisions, the system can warn the doctor about the heavy inter-arch collisions. For example, a tool which is used to switch occlusal view with inter-arch contacts visualization can have a special red indicator, notifying the doctor about heavy collisions; or it can have a green indicator if the case has only normal occlusal contacts.

Figure 11A:
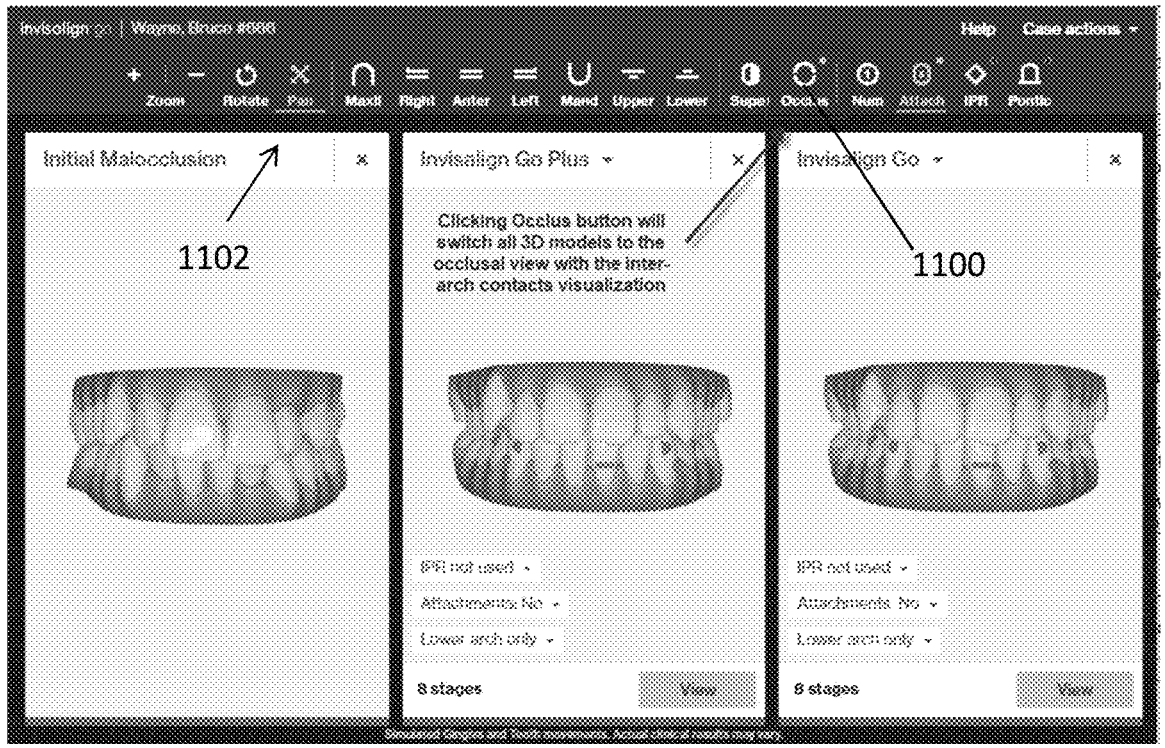
FIGS. 11A and 11B illustrate that the multiple treatment plan view can be toggled between a closed mouth view and an open mouth occlusal view.
Figure 11B:
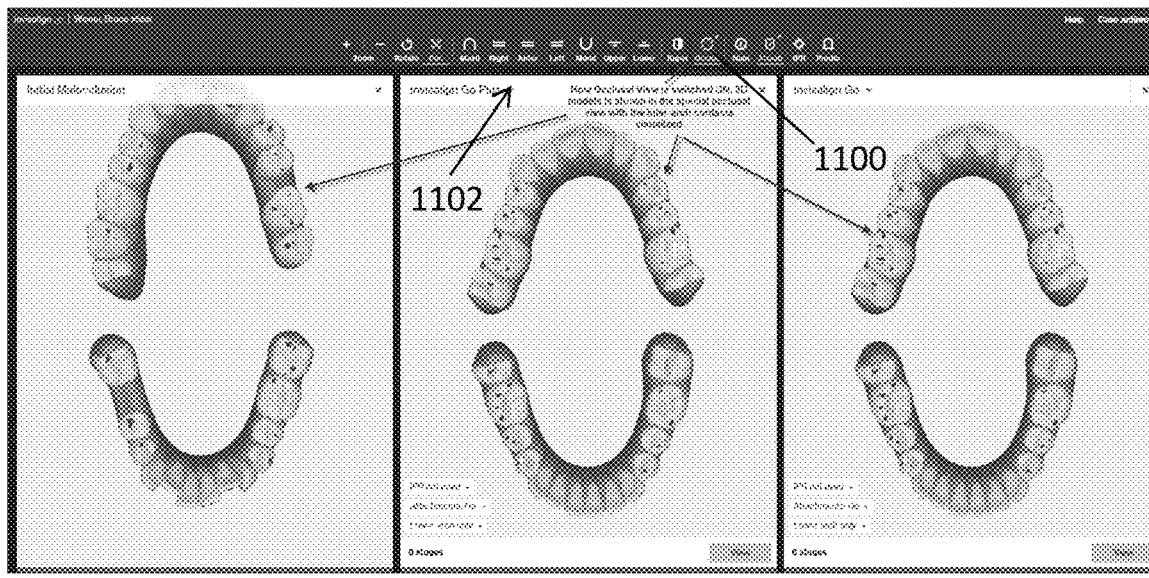

As shown in the multiple treatment plans views in FIGS. 11A and 11B, for switching to the special occlusal view with inter-arch contacts visualization the doctor can use an "OCCLUS" button 1100 on the feature toolbar 1102 that can be displayed on the top portion of the screen or along another screen edge. FIG. 11A shows a closed mouth view with the occlus button 1100 not selected. A filled green indicator on the occlus button indicates that there are normal occlusal contacts through the treatment and that no heavy inter-arch collisions are present during the course of the treatment. Clicking or otherwise selecting the occlus button 1100 changes the screen to the occlus view as shown in FIG. 11B with all 3D models changed to the occlusal view with the occlusal contacts visualization enabled. With the occlusal view, the doctor is able to compare teeth alignment for both arches for different treatment plans selected in MTP view and compare it with the initial teeth position shown on the initial malocclusion 3D model.

Figure 12:
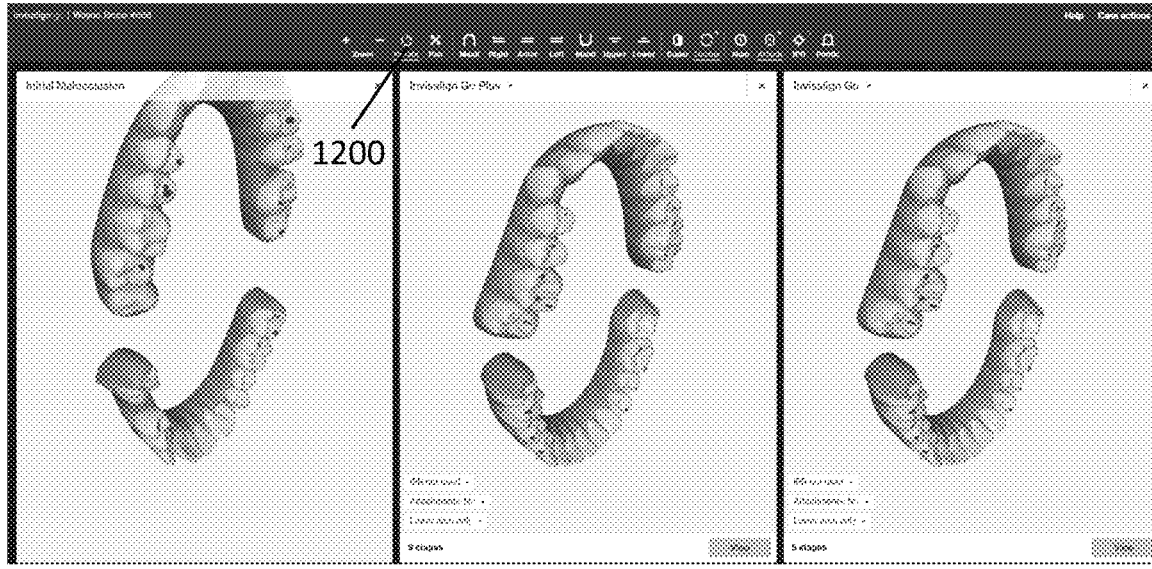
FIG. 12 illustrates that rotation of a 3D model in the multiple treatment plan view simultaneously rotates the other 3D models such that all the models are presented at the same viewing angle and perspective.

As shown in FIG. 12, the 3D models can be simultaneously rotated by selecting the rotate button 1200. Rotating the 3D models allows the doctor to view and analyze any side of the 3D model and check inter-arch contacts in detail if needed. Rotating one 3D model will rotate the others in the MTP view simultaneously, with all 3D models presented at the same angle and perspective. This allows the doctor to check differences in all the selected treatment plans and the initial malocclusion right away in one screen by comparing visualized information from any side on all 3D models shown in that view.

Figure 13A:
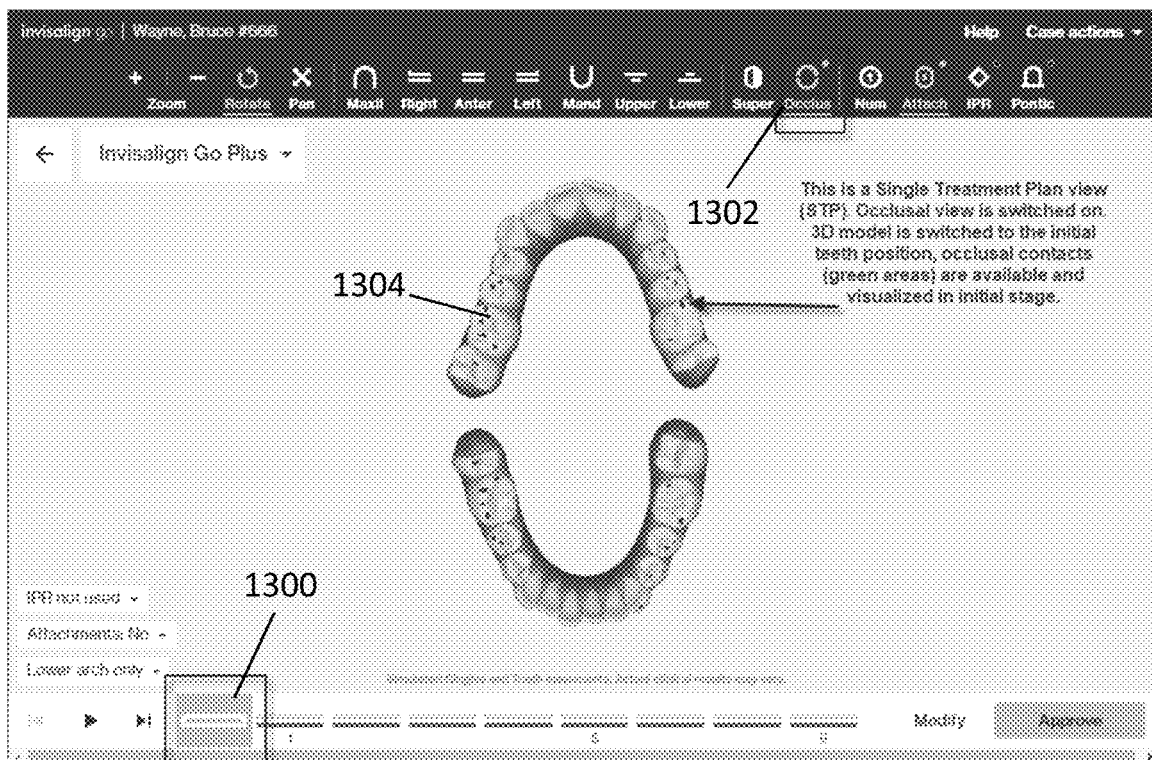
Figure 13B:
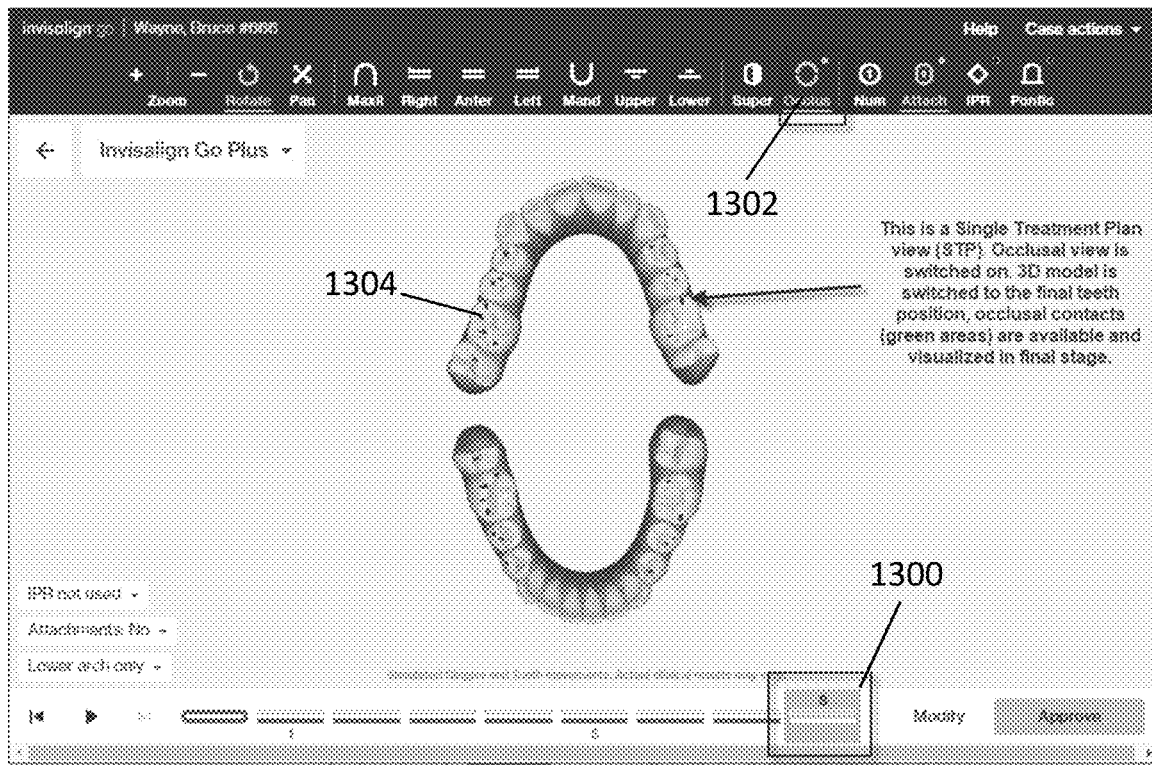
Figure 13C:
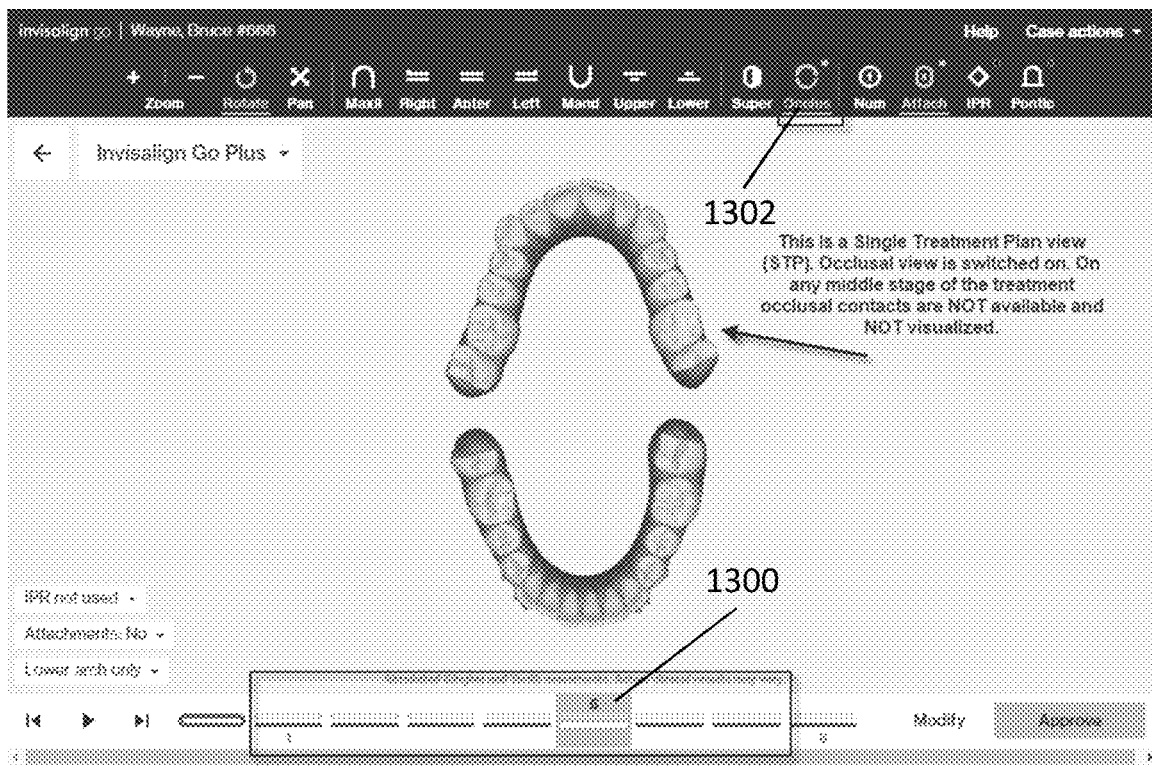

As shown in FIGS. 13A-13C, when the doctor is in a single treatment plan (STP) view (when only one treatment plan is available for review with additional details like staging), the treatment stages are viewable via the staging toolbar 1300 and the occlus button 1302 can be used to check/review/analyze inter-arch collisions/contacts 1304 on any stage of the treatment. FIG. 13A illustrates a STP view of the initial teeth position with the occlusal view switched on. FIG. 13B illustrates a STP view of the final teeth position with the occlusal view switched on. FIG. 13C illustrates a STP view of a middle stage of the treatment with the occlusal view switched on. However, in some embodiments, as shown in FIG. 13C, the occlusal contacts are not shown in any of the middle stages. In other embodiments, the occlusal contacts 1304 are also shown in the middle stages.

Figure 14A:
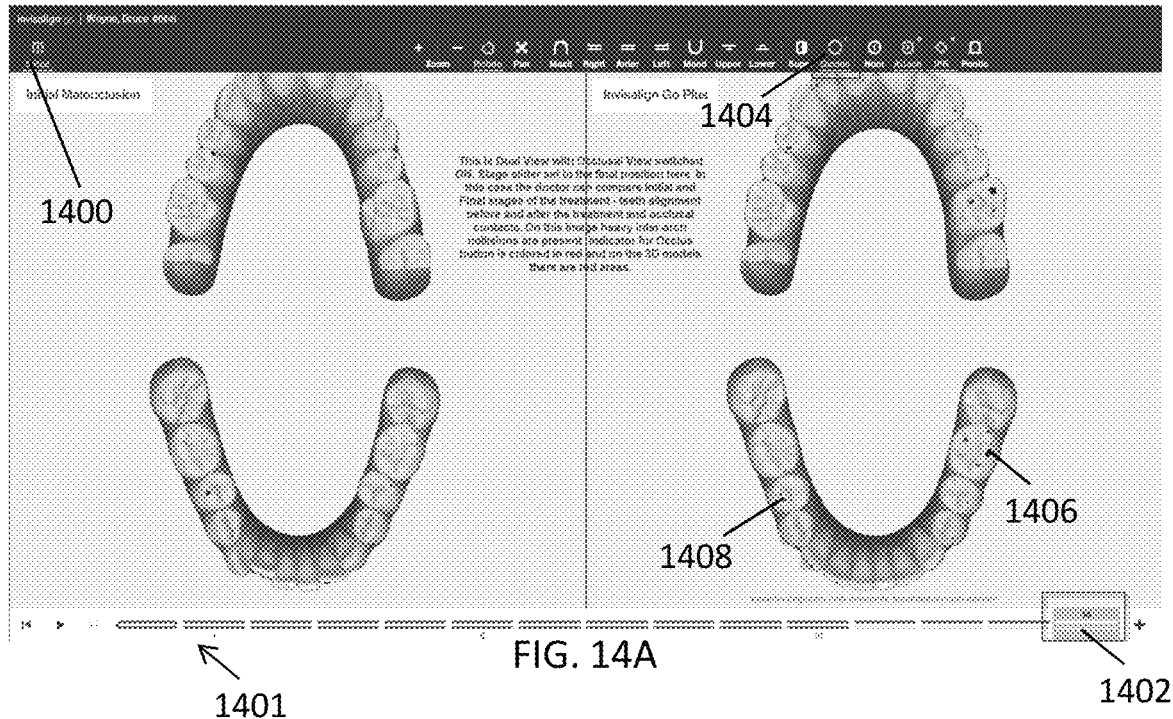
Figure 14B:
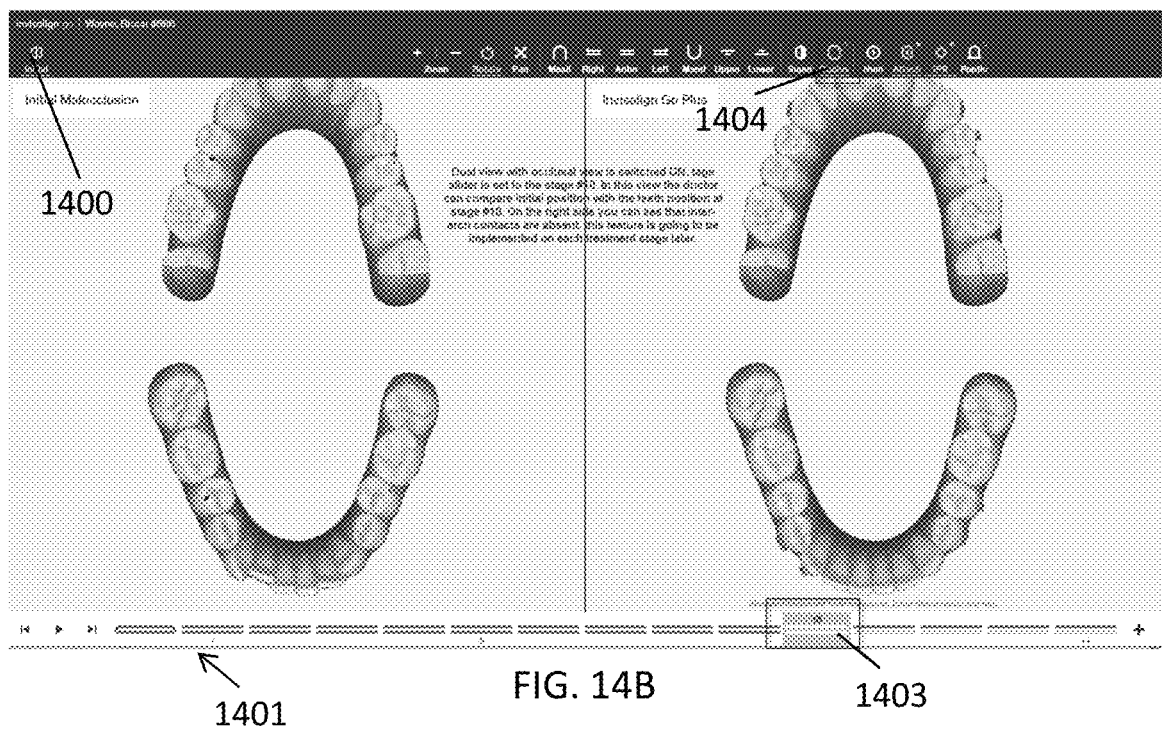

As shown in FIGS. 14A and 14B, by clicking or selecting the dual view button 1400 in the STP view the doctor also is able to switch to dual view where two 3D models are visualized simultaneously: the left one with the 3D model for initial malocclusion; the right one with the treatment plan and stage selected. In this view, as shown in FIG. 14A, with the final stage 1402 selected and occlusal view 1404 switched on, the doctor can compare teeth alignment before and after the treatment and see how inter-arch contacts are changed. In FIG. 14A, the heavy inter-arch collisions 1406 are shown in red and the normal occlusal contacts 1408 are shown in green. In the dual view mode the doctor is also able to switch the right 3D model to any stage of the treatment by selecting the desired stage using the stage toolbar 1401. When occlusal view is switched on in this case, the doctor can also compare details for the teeth alignment and inter-arch contacts for initial teeth position and any stage of the treatment. In FIG. 14B, the stage toolbar 1401 has been used to select stage 10 1403 with the occlusal view switched on. In some embodiments, as shown in FIG. 14B, the inter-arch contacts are not shown in the middle stages, while in other embodiments, the inter-arch contacts are shown for the middle stages.

Examples

Figure 1C:
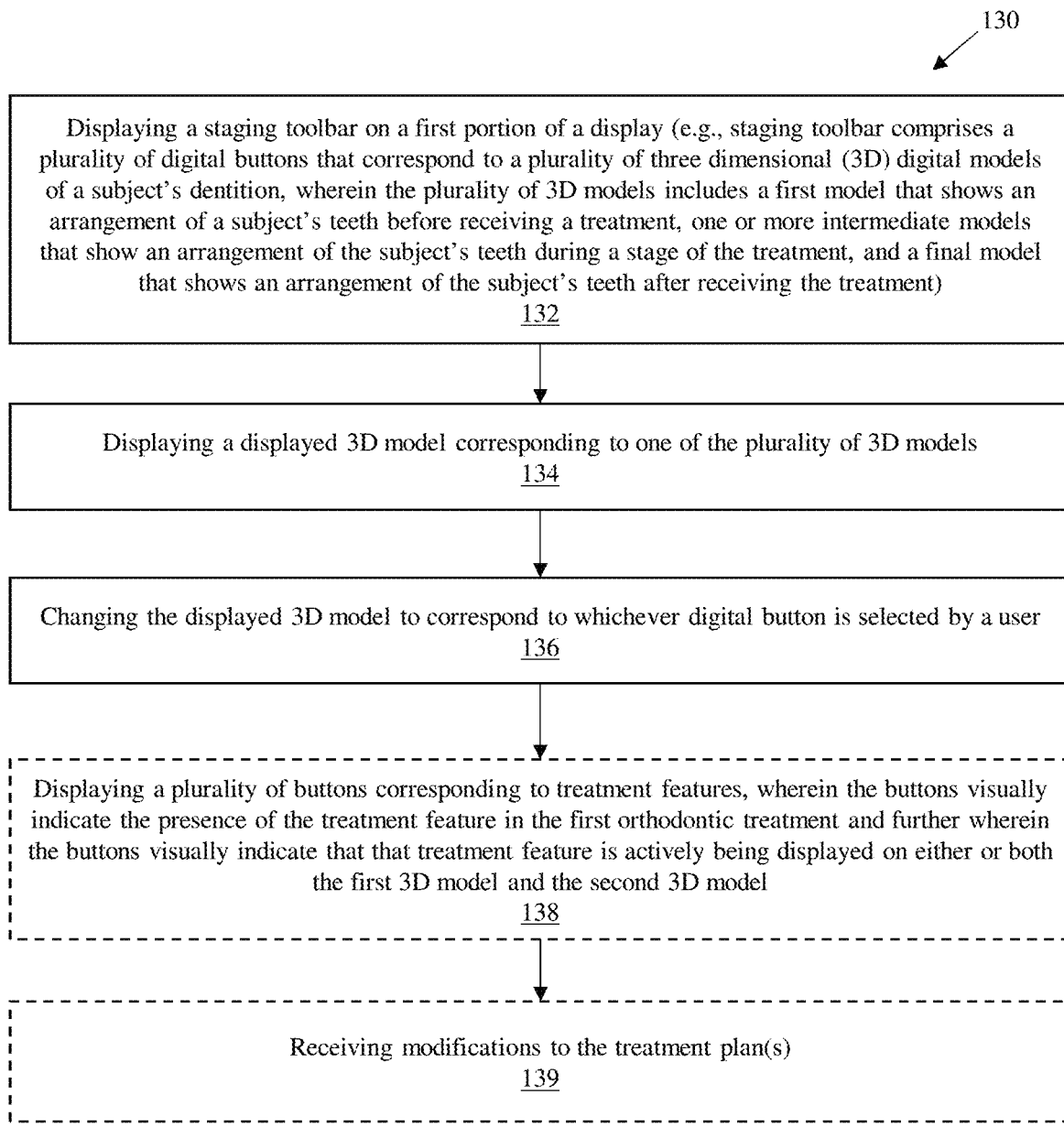
FIG. 1C schematically illustrates one example of a method of treatment plan review and/or modification as described herein.
Figure 1D:
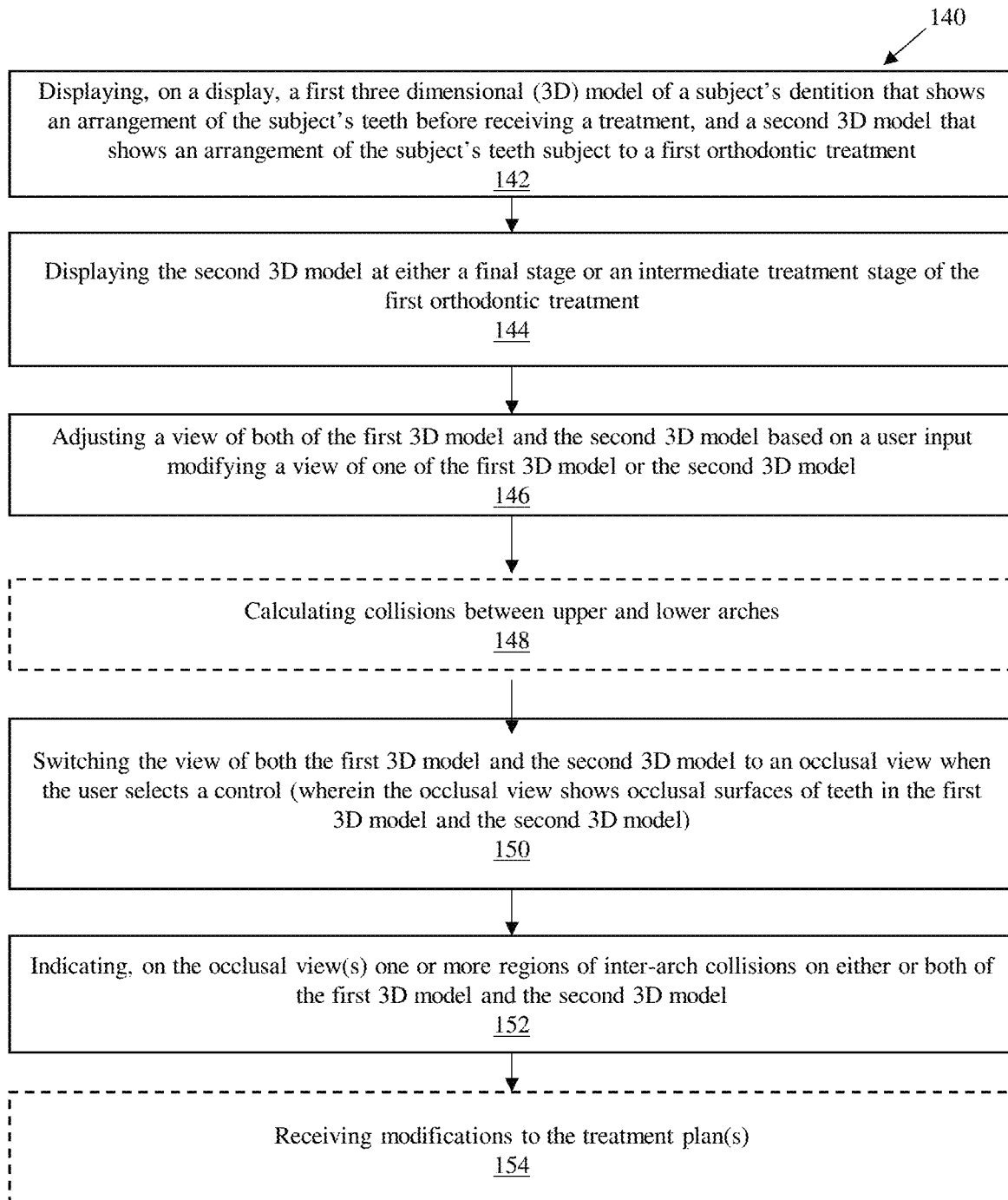
FIG. 1D schematically illustrates one example of a method of treatment plan review and/or modification including occlusal contact severity.

FIGS. 1C and 1D illustrate examples of methods, e.g., methods of treatment plan review and/or modification as described herein and illustrated above. In FIG. 1C, the method 130 may include initially receiving or generating a 3D digital model of the patient's teeth in an initial (untreated) confirmation, and one or more 3D digital models of the patient's teeth following a treatment plan (or plans). The digital models may be based on a digital scan of the patient's dentition (e.g., from an intraoral scan and/or a scan of a dental impression). The method may also include displaying a staging toolbar on a first portion of a display, wherein the staging toolbar comprises a plurality of digital buttons that correspond to a plurality of three dimensional (3D) digital models of a subject's dentition, wherein the plurality of 3D models includes a first model that shows an arrangement of a subject's teeth before receiving a treatment, one or more intermediate models that show an arrangement of the subject's teeth during a stage of the treatment, and a final model that shows an arrangement of the subject's teeth after receiving the treatment 132. Thereafter the method may include displaying a displayed 3D model corresponding to one of the plurality of 3D models 134, and changing the displayed 3D model to correspond to whichever digital button is selected by a user 136 (e.g., adjusting a view of the displayed 3D model shown on the display based on a user input, wherein the view of the displayed 3D model is applied to the changed displayed 3D model as the user selects the digital buttons). Optionally, the method may include displaying a plurality of buttons corresponding to treatment features, wherein the buttons visually indicate the presence of the treatment feature in the first orthodontic treatment and further wherein the buttons visually indicate that that treatment feature is actively being displayed on either or both the first 3D model and the second 3D model 138. The method may also include receiving any modifications to the treatment plan from the user 139. These modifications may then be used to generate a new or modified treatment plan.

FIG. 1D illustrates another example of a method of treatment plan review and/or modification. In FIG. 1D, the method includes indicating occlusal contact severity. For example, as shown in FIG. 1D, the method includes displaying, on a display, a first three dimensional (3D) model of a subject's dentition that shows an arrangement of the subject's teeth before receiving a treatment, and a second 3D model that shows an arrangement of the subject's teeth subject to a first orthodontic treatment 142. As mentioned the method may also include retrieving, receiving or otherwise generating the 3D digital model(s). The method may further include displaying the second 3D model at either a final stage or an intermediate treatment stage of the first orthodontic treatment 144, and adjusting a view of both of the first 3D model and the second 3D model based on a user input modifying a view of one of the first 3D model or the second 3D model 146. The method may include receiving the collisions between the upper and lower arches in each of the untreated and one or more treated 3D models; optionally the method may include calculating collisions between upper and lower arches of the treated and/or untreated 3D models 148.

The one or more regions of inter-arch collisions may be indicated on either or both of the first 3D model and the second 3D model 152. This may be indicated in color, by label, etc., as described above.

Once the occlusive view is selected by the user, the method or system may then switch the view of both the first 3D model and the second 3D model to an occlusal view (e.g., when the user selects a control, wherein the occlusal view shows occlusal surfaces of teeth in the first 3D model and the second 3D model) 150. The system may then optionally receive, from the user, modifications to one or more treatment plans, such as further treatment instructions 152.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, the method comprising:

receiving a first orthodontic treatment plan comprising a plurality of stages, where each stage comprises a different arrangement of a subject's teeth;

selecting a stage from the first orthodontic treatment plan to be displayed;

displaying, on a display, a first three dimensional (3D) model of a subject's dentition that shows an arrangement of the subject's teeth before receiving a treatment, adjacent to a second 3D model that shows an arrangement of the subject's teeth in the selected stage, subject to the first orthodontic treatment;

wherein the second 3D model is displayed at either a final stage or an intermediate treatment stage of the first orthodontic treatment;

adjusting, simultaneously, a view of both of the first 3D model and the second 3D model based on a user input modifying a view of one of the first 3D model or the second 3D model;

switching the view of both the first 3D model and the second 3D model to an occlusal view when the user selects a control, wherein the occlusal view shows occlusal surfaces of teeth in the first 3D model and the second 3D model, further wherein the occlusal view indicates one or more regions of inter-arch collisions on either or both of the first 3D model and the second 3D model.

2. The method of claim 1, wherein the occlusal view indicates one or more regions of inter-arch collisions using an indicator that is scaled to differentiate a relative degree of contact between an upper arch and a lower arch.

3. The method of claim 2, wherein the indicator is colored differently to differentiate regions of normal contact from regions of high contact.

4. The method of claim 1, further comprising calculating regions of inter-arch collision on the first 3D model and calculating regions of inter-arch collision on region on the second 3D model.

5. The method of claim 1, further comprising displaying a staging toolbar on a portion of a display, wherein the staging toolbar comprises a plurality of digital buttons that correspond to a plurality of treatment stages of the first orthodontic treatment; and changing the displayed stage of the second 3D model to correspond to a stage selected by the user from the staging toolbar.

6. The method of claim 1, wherein displaying comprises displaying side-by-side.

7. The method of claim 1, wherein displaying comprises displaying an upper arch engaged with a lower arch of the first 3D model and displaying an upper arch engaged with a lower arch of the second 3D model.

8. The method of claim 1, further comprising displaying a plurality of buttons corresponding to treatment features, wherein the buttons visually indicate a presence of a treatment feature in the first orthodontic treatment and further wherein the buttons visually indicate that that treatment feature is actively being displayed on either or both the first 3D model and the second 3D model.

9. The method of claim 8, wherein the treatment features comprise: tooth numbering, attachments, interproximal reduction spacing, and pontics.

10. The method of claim 1, wherein adjusting the view of both of the first 3D model and the second 3D model based on the user input comprises modifying one or more of: a rotation, a zoom, or a pan of the first 3D model and the second 3D model.

11. The method of claim 1, wherein the user input includes selecting from a set of preset views.

12. A method, the method comprising:
receiving a first orthodontic treatment plan comprising a first plurality of stages and a second orthodontic treatment plan comprising a second plurality of stages, where each stage comprises a different arrangement of a subject's teeth in the first or second orthodontic treatment plan;
selecting a stage from the first orthodontic treatment plan to be displayed and a stage from the second orthodontic treatment plan to be displayed;
displaying, on a display, a first three dimensional (3D) model of a subject's dentition that shows an arrangement of the subject's teeth before receiving a treatment, adjacent to a second 3D model that shows an arrangement of the subject's teeth in the selected stage from the first orthodontic treatment plan, and adjacent to a third 3D model that shows an arrangement of the subject's teeth in the selected stage from the second orthodontic treatment plan;
wherein the second 3D model and third 3D model are displayed at either a final stage or an intermediate treatment stage of the first and second orthodontic treatment plans;
adjusting a view of the first 3D model, the second 3D model, and the third 3D model based on a user input modifying a view of one of the first, second or third 3D models wherein adjusting the view comprises adjusting one or more of a rotation, a zoom and a pan;
switching the view of each of the first, second and third 3D models to an occlusal view when the user selects a control, wherein the occlusal view shows occlusal surfaces of teeth in the first, second and third 3D models, further wherein the occlusal view indicates one or more regions of inter-arch collisions on each of the first, second and third 3D models, using an indicator that is scaled to differentiate a relative degree of contact between an upper arch and a lower arch.

13. The method of claim 12, wherein the indicator is colored differently to differentiate regions of normal contact from regions of high contact.

14. The method of claim 12, further comprising calculating regions of inter-arch collision on the first 3D model and calculating regions of inter-arch collision on region on the second 3D model.

15. The method of claim 12, further comprising displaying a staging toolbar on a portion of a display, wherein the staging toolbar comprises a plurality of digital buttons that correspond to a plurality of treatment stages of the first orthodontic treatment; and changing the displayed stage of the second 3D model to correspond to a stage selected by the user from the staging toolbar.

16. The method of claim 12, wherein displaying comprises displaying side-by-side.

17. The method of claim 12, wherein displaying comprises displaying the upper arch engaged with the lower arch of the first 3D model and displaying the upper arch engaged with the lower arch of the second 3D model.

18. The method of claim 12, further comprising displaying a plurality of buttons corresponding to treatment features, wherein the buttons visually indicate a presence of a treatment feature in the first orthodontic treatment and further wherein the buttons visually indicate that that treatment feature is actively being displayed on either or both the first 3D model and the second 3D model.

19. The method of claim 18, wherein the treatment features comprise: tooth numbering, attachments, interproximal reduction spacing, and pontics.

20. The method of claim 12, wherein adjusting the view of both of the first 3D model and the second 3D model based on the user input comprises modifying one or more of: a rotation, a zoom, or a pan of the first 3D model and the second 3D model.

21. The method of claim 12, wherein the user input includes selecting from a set of preset views.

22. A system for visualizing a subject's teeth, the system comprising:
one or more processors;
a memory coupled to the one or more processors, the memory configured to store computer-program instructions, that, when executed by the one or more processors, perform a computer-implemented method comprising:
receiving a first orthodontic treatment plan comprising a plurality of stages, where each stage comprises a different arrangement of the subject's teeth;
selecting a stage from the first orthodontic treatment plan to be displayed;
displaying, on a display, a first three dimensional (3D) model of a subject's dentition that shows an arrange-
ment of the subject's teeth before receiving a treatment, adjacent to a second 3D model that shows an arrangement of the subject's teeth in the selected stage, subject to the first orthodontic treatment;

wherein the second 3D model is displayed at either a final stage or an intermediate treatment stage of the first orthodontic treatment;

adjusting, simultaneously, a view of both of the first 3D model and the second 3D model based on a user input modifying a view of one of the first 3D model or the second 3D model;

switching the view of both the first 3D model and the second 3D model to an occlusal view when the user selects a control, wherein the occlusal view shows occlusal surfaces of teeth in the first 3D model and the second 3D model, further wherein the occlusal view indicates one or more regions of inter-arch collisions on either or both of the first 3D model and the second 3D model.

\* \* \* \* \*